United States Patent
Lilot et al.

(10) Patent No.: US 9,413,709 B1
(45) Date of Patent: Aug. 9, 2016

(54) DETERMINING MEMBERSHIP IN A SOCIAL GRAPH

(71) Applicant: Google Inc., Mountain View, CA (US)

(72) Inventors: Jean-Christophe Emmanuel Lilot, Mountain View, CA (US); Bryant Fong, Kirkland, WA (US); Nish Thakkar, Kirkland, WA (US)

(73) Assignee: GOOGLE INC., Mountain View, CA (US)

( * ) Notice: Subject to any disclaimer, the term of this patent is extended or adjusted under 35 U.S.C. 154(b) by 613 days.

(21) Appl. No.: 13/720,466

(22) Filed: Dec. 19, 2012

Related U.S. Application Data

(60) Provisional application No. 61/723,706, filed on Nov. 7, 2012.

(51) Int. Cl.
*G06F 15/16* (2006.01)
*H04L 12/58* (2006.01)

(52) U.S. Cl.
CPC ..................................... *H04L 51/32* (2013.01)

(58) Field of Classification Search
CPC combination set(s) only.
See application file for complete search history.

(56) References Cited

U.S. PATENT DOCUMENTS

| | | | |
|---|---|---|---|
| 6,323,863 B1* | 11/2001 | Shinagawa et al. | 345/441 |
| 7,756,141 B1* | 7/2010 | Beshai et al. | 370/400 |
| 8,185,558 B1* | 5/2012 | Narayanan et al. | 707/798 |
| 8,572,129 B1* | 10/2013 | Lee et al. | 707/798 |
| 8,977,611 B2* | 3/2015 | Tseng | 707/728 |
| 2002/0143866 A1* | 10/2002 | Lewis et al. | 709/203 |
| 2009/0217248 A1* | 8/2009 | Bently et al. | 717/132 |
| 2010/0325208 A1* | 12/2010 | Chitturi et al. | 709/204 |
| 2012/0136949 A1* | 5/2012 | Virani et al. | 709/206 |
| 2012/0150955 A1* | 6/2012 | Tseng | 709/204 |
| 2012/0266081 A1* | 10/2012 | Kao | 715/751 |
| 2014/0082568 A1* | 3/2014 | Hulet et al. | 715/853 |

\* cited by examiner

*Primary Examiner* — Saket K Daftuar
(74) *Attorney, Agent, or Firm* — Lowenstein Sandler LLP

(57) ABSTRACT

A method for determining membership/follower status in a social network is provided. Outgoing edge data and anti-outgoing edge data of a first user are read. A second user is determined to be a member of the first user's social graph when the second user is designated in the outgoing edge data and not designated in the anti-outgoing edge data of the first user. In another implementation, a method for removing a second user from a social graph of a first user is provided. A designation of the second user is removed from outgoing edge data of the first user, and a designation of the first user is removed from incoming edge data of the second user. A designation of the first user is added to anti-outgoing edge data of the second user, and a designation of the second user is added to anti-incoming edge data of the first user.

18 Claims, 18 Drawing Sheets

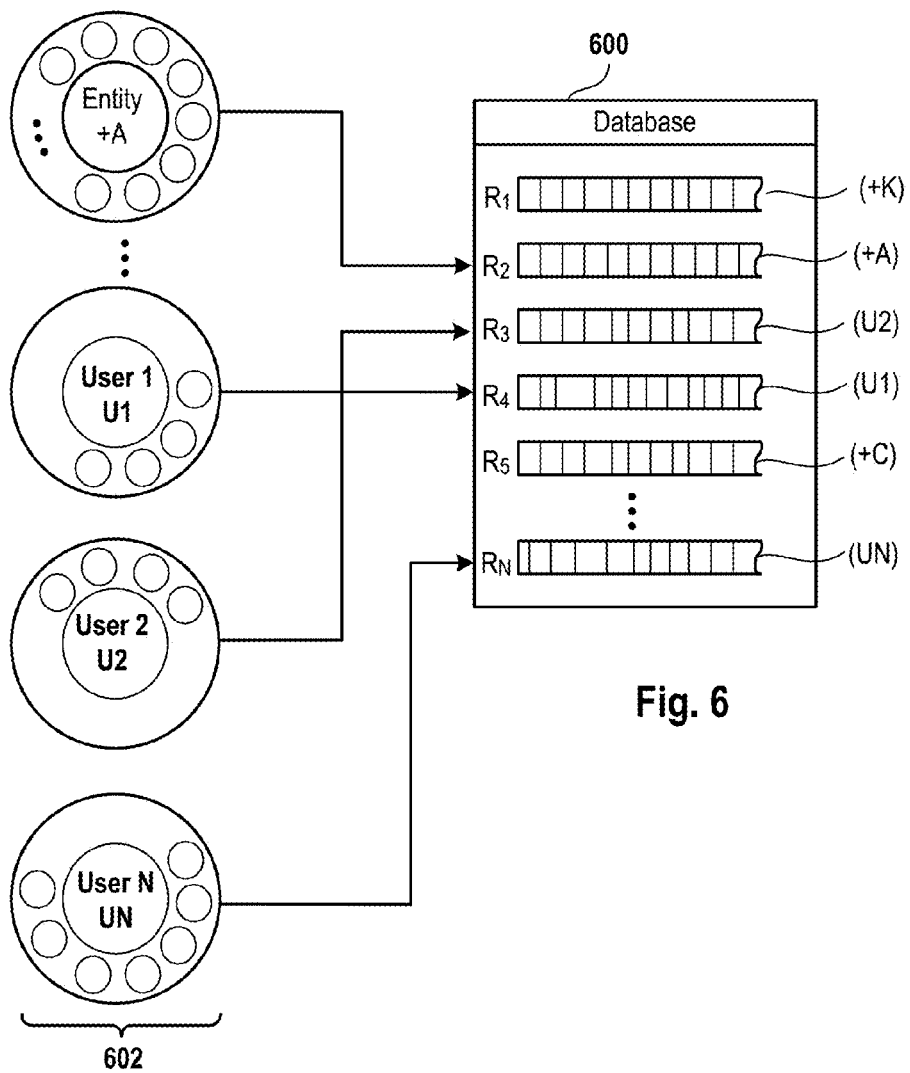
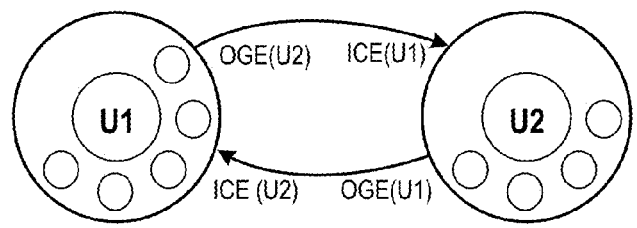
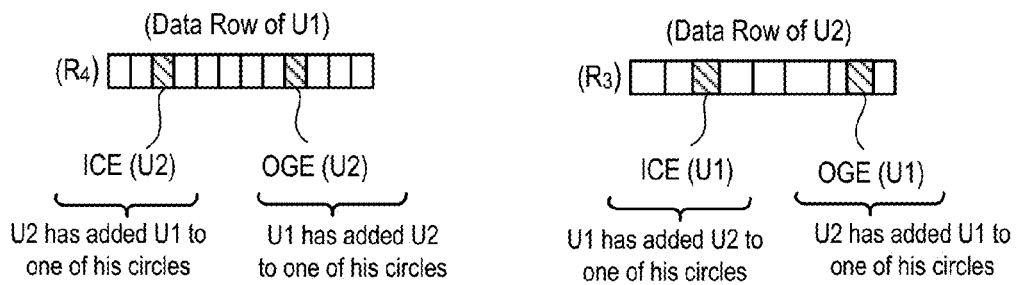
Fig. 6
Fig. 7

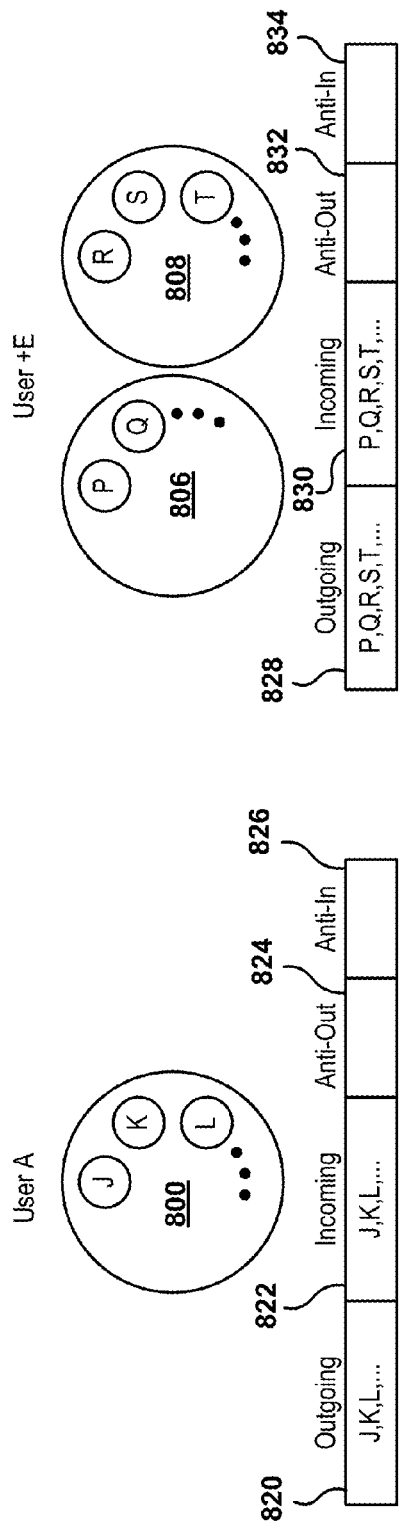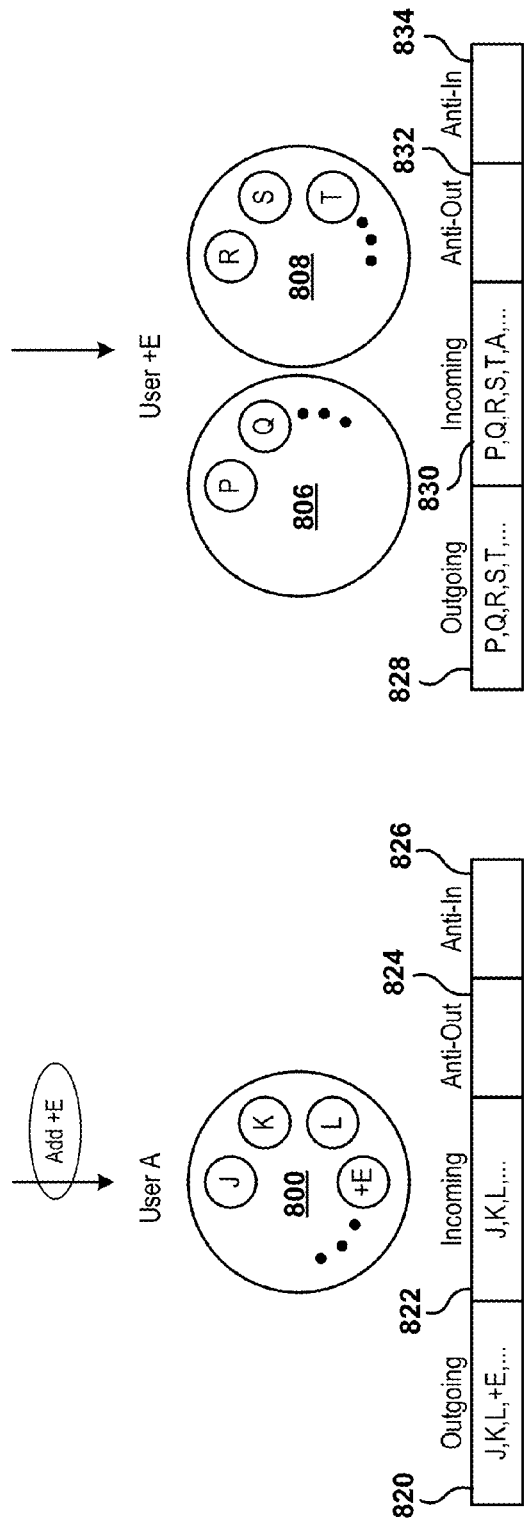
Fig. 14
Fig. 15

DETERMINING MEMBERSHIP IN A SOCIAL GRAPH

BACKGROUND

The communication capability provided by social networks has opened new forms of communication in today's society, making it easier for people to communicate with each other, as well as providing new vehicles of communications between people and businesses, or with other community groups. As people's interest in using social networks for communication has grown, so has the interest of businesses in using social networks to communicate with people, enabling a new form of communication for keeping customers informed and promoting their products.

SUMMARY

Implementations of the present disclosure provide methods, systems, and computer programs for processing data to define social graph membership and/or follower status of a user relative to another user in a social network. It should be appreciated that the present disclosure can be implemented in numerous ways, such as a process, an apparatus, a system, a device or a method on a computer readable medium. Several implementations of the present disclosure are described below.

In some implementations, a method is provided. According to the method, a request is received from a first user to remove a second user from a social graph of the first user. A designation of the second user is removed from outgoing edge data of the first user, the outgoing edge data of the first user indicating one or more users as members of the first user's social graph when the one or more users are not also designated in anti-outgoing edge data of the first user. A designation of the first user is removed from incoming edge data of the second user, the incoming edge data of the second user indicating one or more users as having added the second user to their social graphs, when the one or more users are not also designated in anti-incoming edge data of the second user. Additionally, each of the operations of the method is executed by a processor.

In some implementations, the method further includes adding a designation of the first user to anti-outgoing edge data of the second user, the designation of the first user in the anti-outgoing edge data of the second user preventing the first user from being determined as a member of the second user's social graph; and adding a designation of the second user to anti-incoming edge data of the first user, the designation of the second user in the anti-incoming edge data of the first user preventing the second user from being determined as having added the first user to the second user's social graph.

In some implementations, the outgoing edge data and anti-outgoing edge data of the first user together define membership in the first user's social graph. The incoming edge data and the anti-incoming edge data of the first user together define one or more users that have added the first user to their social graphs. The outgoing edge data and the anti-outgoing edge data of the second user together define membership in the second user's social graph. And the incoming edge data and the anti-incoming edge data of the second user together define one or more users that have added the second user to their social graphs.

In some implementations, the method further includes deleting the designation of the first user in the anti-outgoing edge data of the second user; deleting, if present, a designation of the first user in the outgoing edge data of the second user; deleting the designation of the second user in the anti-incoming edge data of the first user; and deleting, if present, a designation of the second user in the incoming edge data of the first user.

In some implementations, each of the deletion operations is performed at a substantially later time than each of the removing and adding operations.

In some implementations, the first user is a person user; and the second user is an entity user.

In other implementations, a method is provided. The method includes reading outgoing edge data of a first user; reading anti-outgoing edge data of the first user; and determining a second user to be a member of the first user's social graph when the second user is designated in the outgoing edge data and the second user is not designated in the anti-outgoing edge data of the first user.

In some implementations, the method further includes reading incoming edge data of the first user; reading anti-incoming edge data of the first user; and determining the second user to have added the first user to the second user's social graph when the second user is designated in the incoming edge data of the first user and when the second user is not designated in the anti-incoming edge data of the first user.

In some implementations, determining the second user to be a member of the first user's social graph includes determining a group within the first user's social graph of which the second user is a member.

In other implementations, a tangible computer readable medium having program instructions embodied thereon is provided, including: program instructions for receiving a request from a first user to remove a second user from a social graph of the first user; program instructions for removing a designation of the second user from outgoing edge data of the first user, the outgoing edge data of the first user indicating one or more users as members of the first user's social graph when the one or more users are not also designated in anti-outgoing edge data of the first user; and program instructions for removing a designation of the first user from incoming edge data of the second user, the incoming edge data of the second user indicating one or more users as having added the second user to their social graphs, when the one or more users are not also designated in anti-incoming edge data of the second user.

In some implementations, the tangible computer readable medium further includes program instructions for adding a designation of the first user to anti-outgoing edge data of the second user, the designation of the first user in the anti-outgoing edge data of the second user preventing the first user from being determined as a member of the second user's social graph; and program instructions for adding a designation of the second user to anti-incoming edge data of the first user, the designation of the second user in the anti-incoming edge data of the first user preventing the second user from being determined as having added the first user to the second user's social graph.

In some implementations, the outgoing edge data and anti-outgoing edge data of the first user together define membership in the first user's social graph; the incoming edge data and the anti-incoming edge data of the first user together define one or more users that have added the first user to their social graphs; the outgoing edge data and the anti-outgoing edge data of the second user together define membership in the second user's social graph; and the incoming edge data and the anti-incoming edge data of the second user together define one or more users that have added the second user to their social graphs.

In some implementations, the tangible computer readable medium further includes program instructions for deleting the designation of the first user in the anti-outgoing edge data of the second user; program instructions for deleting, if present, a designation of the first user in the outgoing edge data of the second user; program instructions for deleting the designation of the second user in the anti-incoming edge data of the first user; and program instructions for deleting, if present, a designation of the second user in the incoming edge data of the first user.

In some implementations, each of the deletion operations is performed at a substantially later time than each of the removing and adding operations.

In some implementations, the first user is a person user; and the second user is an entity user.

In other implementations, a tangible computer readable medium having program instructions embodied thereon is provided, including: program instructions for reading outgoing edge data of a first user; program instructions for reading anti-outgoing edge data of the first user; program instructions for determining a second user to be a member of the first user's social graph when the second user is designated in the outgoing edge data and the second user is not designated in the anti-outgoing edge data of the first user.

In some implementations, the tangible computer readable medium further includes program instructions for reading incoming edge data of the first user; program instructions for reading anti-incoming edge data of the first user; and program instructions for determining the second user to have added the first user to the second user's social graph when the second user is designated in the incoming edge data of the first user and when the second user is not designated in the anti-incoming edge data of the first user.

In some implementations, determining the second user to be a member of the first user's social graph includes determining a group within the first user's social graph of which the second user is a member.

Other aspects will become apparent from the following detailed description, taken in conjunction with the accompanying drawings.

BRIEF DESCRIPTION OF THE DRAWINGS

The disclosure may best be understood by reference to the following description taken in conjunction with the accompanying drawings.

FIG. 6 illustrates example users, including entities and people users that have accounts in a social network, in accordance with one implementation of the present disclosure.

FIG. 7 illustrates an example of a relationship between user U1 and user U2, in accordance with one implementation of the present disclosure.

FIG. 14 illustrates circle membership and follower status for a user and an entity user, as established by edge data rows.

FIG. 15 illustrates addition of an entity user E to a user's circles.

DETAILED DESCRIPTION

The following implementations describe methods, systems, and computer programs for processing data to control display of followers of an entity to viewers of an entity page of the entity in a social network. It will be apparent, that the present implementations may be practiced without some or all of these specific details.

Figure 1:
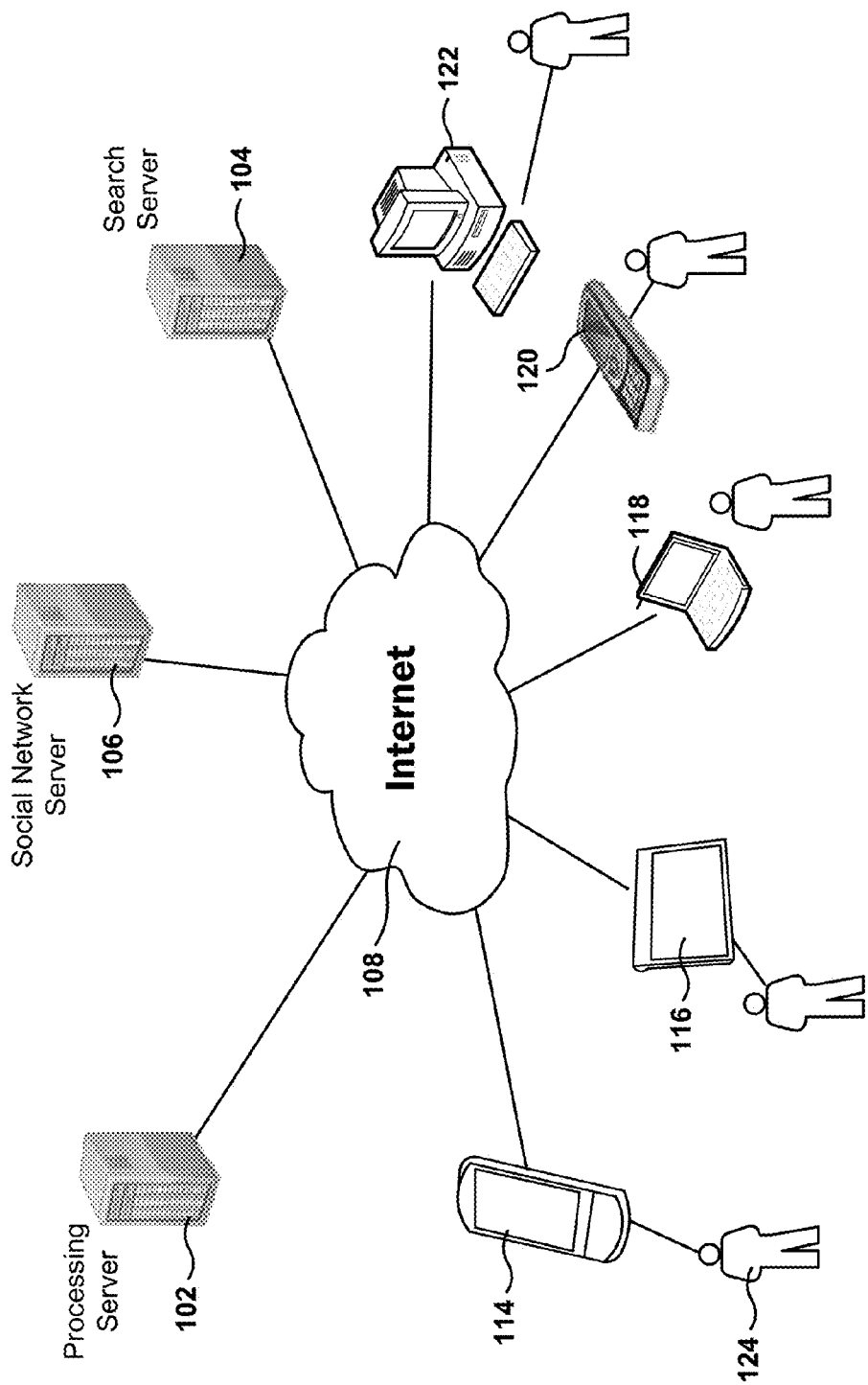
FIG. 1 illustrates the architecture of a system for implementing implementations of the disclosure, according to one implementation.

FIG. 1 provides one example architecture of a system that may utilize implementations described herein. Users 124 interact with each other in the context of a social network, where users include real people and entities. In one implementation, entities perform interactive actions similar to people, although an entity may not be an individual person. For instance, an entity may be a commercial enterprise that may wish to market goods or services. In some implementations, a person may be an entity as well when the person is acting as a public figure, such as a popular artist, a political figure, a world leader, etc. Each user has an account in the social network, and the account includes at least a user name. In addition, each account includes a profile of the user with additional information about the user, such as birth date, gender, residence, favorite activities, etc. The user is in control of what information is added to the profile, and what information is shared with others. A user may access the social network through different devices such as a smart phone 114, a tablet computer 116, a laptop 118, a mobile phone 120, a personal computer 122, or any computing device that provides access to the Internet. Of course, the illustrated devices are only examples.

In one implementation, social network server 106 delivers services that enable users to interface with each other. The social network provides a site that enables users to define user accounts, which can be accounts for people and entity accounts. Through those accounts, users are able to connect with their friends, group of friends, entities, groups of entities, etc. In one implementation, the relationships established in the social network may be utilized in other contexts. Processing server 102 manages the electronic messages between persons and non-person entities, by enforcing rules that enable or disable communications and/or actions within the social network. Search server 104 provides Internet search capabilities.

In one implementation, the social network provides customizable controls that people may use to manage interactions and communications with non-person entities. In one example, the logic executing the social network may define various services and controls. One example service is designed for real person users (e.g., user accounts). Another example service is designed for non-person entities (e.g., entity accounts). The entity account of the entity, on the other hand, is similar to a user account of a person, however the services and controls are different. As noted above, an entity may be a business, a famous person or figure, a commercial figure, an artist, a celebrity, a government group, a brand, a political figure, a community association, a non-profit organization, an entity that provides services, an entity that provides goods, an entity that provides goods and services, etc. Furthermore, the entity may provide its goods or services primarily on the Internet, primarily as a brick and mortar outfit, or a combination thereof. For description purposes, a real person may be referred to herein as a person, people, or an individual.

For description purposes, a non-person entity may be referred to herein as simply an entity, a company, a corporation, a business, an entity account, etc. An entity may be a user, although its use will be through an entity account. A user, as referred to herein, is a generic term for a person or entity, unless otherwise noted. A non-entity user, therefore, may utilize the social network through a user account.

In one implementation, the social network provides entities with a specific type of interface for posting messages, communicating, sharing, and generally interacting within the social network. In one implementation, this interface for entities is referred to as "entity pages," indicated by a token, e.g., "+", followed by the name of the entity in the social network (e.g., Acme corporation has a "+Acme" page). Real-persons have "person pages," which are different from entity pages and have different functionality, although some features are common to both entity pages and person pages. Although the symbol "+" and word "plus" is referred to herein as denoting a type of site or place within the social network, it should be appreciated that any symbol, identifier, word, or character may be used to define or identify the social services. In an alternate implementation, the services can be provided without the use of any special symbols or denoted nomenclature. Thus, so long as the social network site provides the functionality defined herein, the nomenclature utilized to denote the services can take on any form, format or identifier.

In one implementation, a real person may act as an entity. For example, the real person may be a public figure which uses the social network to promote commercial or social activities associated with this persona. In this case, the person is treated by the social network as an entity because the main purpose of the public figure is to promote commercial or social activities. This person may, for example, have a user account as well as an entity account. The user, when acting for the entity, will login to her entity account. The user can therefore act in various roles, consistent with their login parameters or assigned privileges. In one implementation, a user can have multiple privileges, which will allow the user to log into her one account, and based on her privileges, will be allowed to access both accounts. Alternatively, each account will have its own login.

In one implementation, a person controls her relationships with entities (e.g., entity pages). In one implementation, interactions between person and entity requires person approval (e.g., an addition of the plus page to the person's social network, or a mention by the person of the entity, which are discussed in more detail below). Otherwise, entity pages present a similar behavior as person pages, once the person has initiated engagement with the entity.

Other implementations may utilize different servers, have the functionality of one server distributed over a plurality of servers, have the functionality of two or more servers combined into a single server, have a different amount of user categories in the social network, categorize users by different criteria, etc. The implementations illustrated in FIG. 1 should therefore not be interpreted to be exclusive or limiting.

Figure 2:
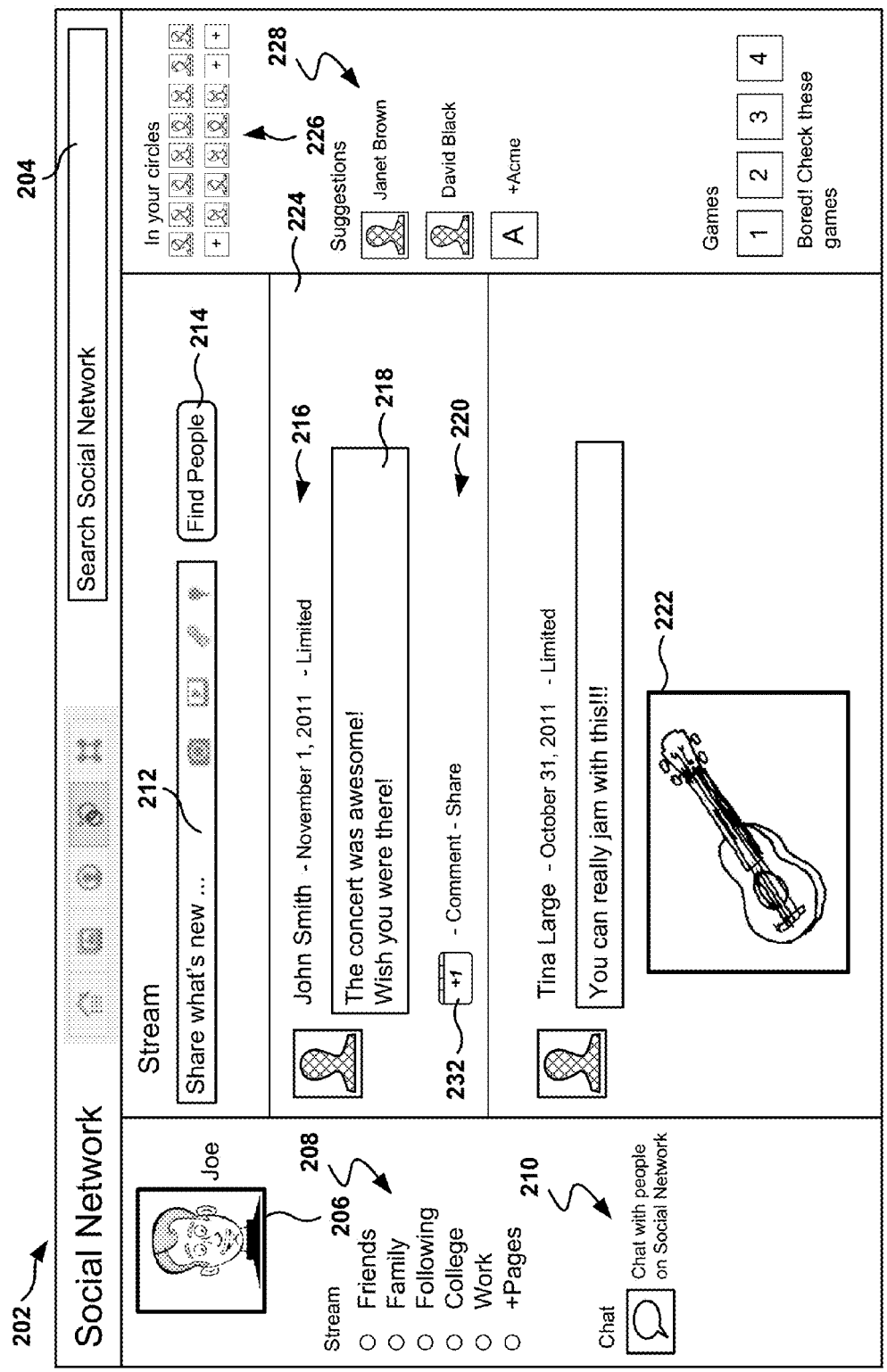
FIG. 2 is a person's web page for interfacing with a social network, according to one implementation.

FIG. 2 is a person's web page for interfacing with a social network, according to one implementation. For example, the person is shown logged into her user account. In one implementation, posts received by a user are referred to as content of a stream in the social network. Page 202 is an example snapshot of a page for viewing a person's stream in the social network, and search field 204 is an input area for searching the social network or other content.

In one implementation, the stream is presented in a middle panel of page 202. Input box 212 enables the person to add new posts in the social network. When the person enters a new post, the person is able to select the destination for the post. The destination could be to the complete social network (e.g., a public post), to a person, or to one or more groups defined by the person.

In one implementation, the groups defined by the person are referred to as "circles," but other configurations for defining groups are also possible. Examples include various graphically designed interfaces or text based lists, dialog boxes, pull downs, radio buttons, and other interfaces defined from a combination of graphical elements, text, images, pictures, combinations thereof, etc. More details regarding the creation of circles are provided below with reference to FIG. 3. In one implementation, the post may be a text message, a photo, a video, a link to a webpage, or a location of the person. Thus, the content and form of the post includes data that can be presented, displayed, listened to, interfaced with, received, sent, shared, approved, or disapproved, etc.

In one implementation, the stream includes posts added by the person, by others socially linked to the person, or by an entity that the person has chosen to follow (e.g., be linked with/to in the social network). In one implementation, an entity may be restricted from posting to a person's stream, unless the person has established a social link with the entity beforehand, e.g., the person has chosen to follow the entity.

In one implementation, each post 224 may include information 216 about the author, the timestamp of the post, and the scope of the post (e.g., public, limited, etc.). Example post 224 may include a text message entered by person "John Smith," but other types of posts are possible, such as photo 222, a video, a link, data, etc. The social network provides options 220 to respond to the post, such as providing an endorsement of the post, adding a comment to the post, or sharing the post with others.

As used herein, an endorsement is a public recommendation of an item, such as a webpage, a person, a post, an entity, etc. An endorsement may also be referred to or provided as an acknowledgment, a +1, a thumbs-up, a √ (check) mark, a confirmation, a ratification, a validation, a seal of approval, a testimonial, support, advocacy, an approval, a ratification, etc. In one implementation, a button is provided in various web pages to enable the person to provide his or her endorsement. See for example +1 button 232. The various web pages can be pages on accounts of the social network, on pages of third party web sites, on search pages, in lists of search results, etc. The +1 button 232 is provided, in one implementation, as an icon that can be selected by the user. When selected, the count associated with the +1 button is displayed, so as to provide the user with information regarding the number of other users that may have selected the +1 button.

Therefore, an endorsement button is not limited to use in the social network, and the endorsement button may appear in a variety of places and sites across the Internet. For example, an endorsement button may be next to an Internet search result, an Internet ad, a news article, a product, etc. When the person presses the endorsement button, a count associated with the item endorsed is incremented. The count measures the popularity of the item, and as people endorse an item, the counter associated with the item increases. In one implementation, the action of endorsing an entity in the social network does not cause the entity to be linked with the person in the social network. In another implementation, for a link to be established in the social network between the person and the entity, a different operation is used where the person explicitly adds the entity to the person's social network. The explicit add can be performed by user selection on an interface, addition of an entity to one of their groups, e.g., circle, or selection of a button, icon, or some input control to follow the entity. The following can also be triggered automatically, based on the user's approval to take this action each time the user views, finds, selects, or interfaces with an account of an entity.

In one implementation, a "mention" is an explicit reference to a user in a communication. A mention allows the creator of the post to grab someone's attention to a post because of the introduction of a mention identifier with, for example, someone's name. In one implementation, a mention is performed by utilizing the '+' or '@' signs followed by the name of a person or entity. It is noted that a "+" sign may be used to mention a person or an entity. When a person or an entity is mentioned within the context of the social network, the person or entity may receive a notification that they have been mentioned in a post (depending on notification settings). The user is also able to see the entirety of the post on which the user is mentioned, even if the post wasn't originally shared with the user.

Button 214 gives the person the ability to enter a different webpage, which provides an interface to identify search parameters for finding people or entities in the social network. A profile picture of the person 206 may be provided on the left side of page 202. In addition, stream filtering options 208 allows the person to limit or tune what is presented on the stream. In one implementation, the filtering options include radio buttons to select or deselect the groups created by the person. In addition, the filtering options also include a radio button to enable or disable messages from entity pages in the stream. Although radio buttons are used, other types of user selectable controls may be used, such as drop downs, text fields, toggles, voice inputs, etc. In one implementation, a chat button 210 is provided to allow the person to engage in conversation with others in the social network. On the right panel, icons 226 represent users in the social network that are linked with the person. In addition, the social network provides suggested new users in area 228. It is again noted that the layout of the features on the page 202 is only one example, and the layout can vary based on site designer preferences.

Implementations of the disclosure allow people to be in control of social messages. For an entity to initiate communication with the person, the person has to first add explicitly the entity to its social network. In one implementation, an entity is not able to initiate communications in the social network with a person that has not added the entity to its social network, or that has explicitly mentioned the entity in a post.

The person is able to perform certain operations affecting the relationship between the person and the entity. The person may endorse the entity, or the person may add the entity to one of her social groups defined in the social network. In one implementation, the fact that the person endorses an entity does not enable the entity to freely initiate full communications or posts with the person. Of course, if the person and the entity are socially linked, the entity may initiate communications with the person and post on the person's user account.

Figure 3:
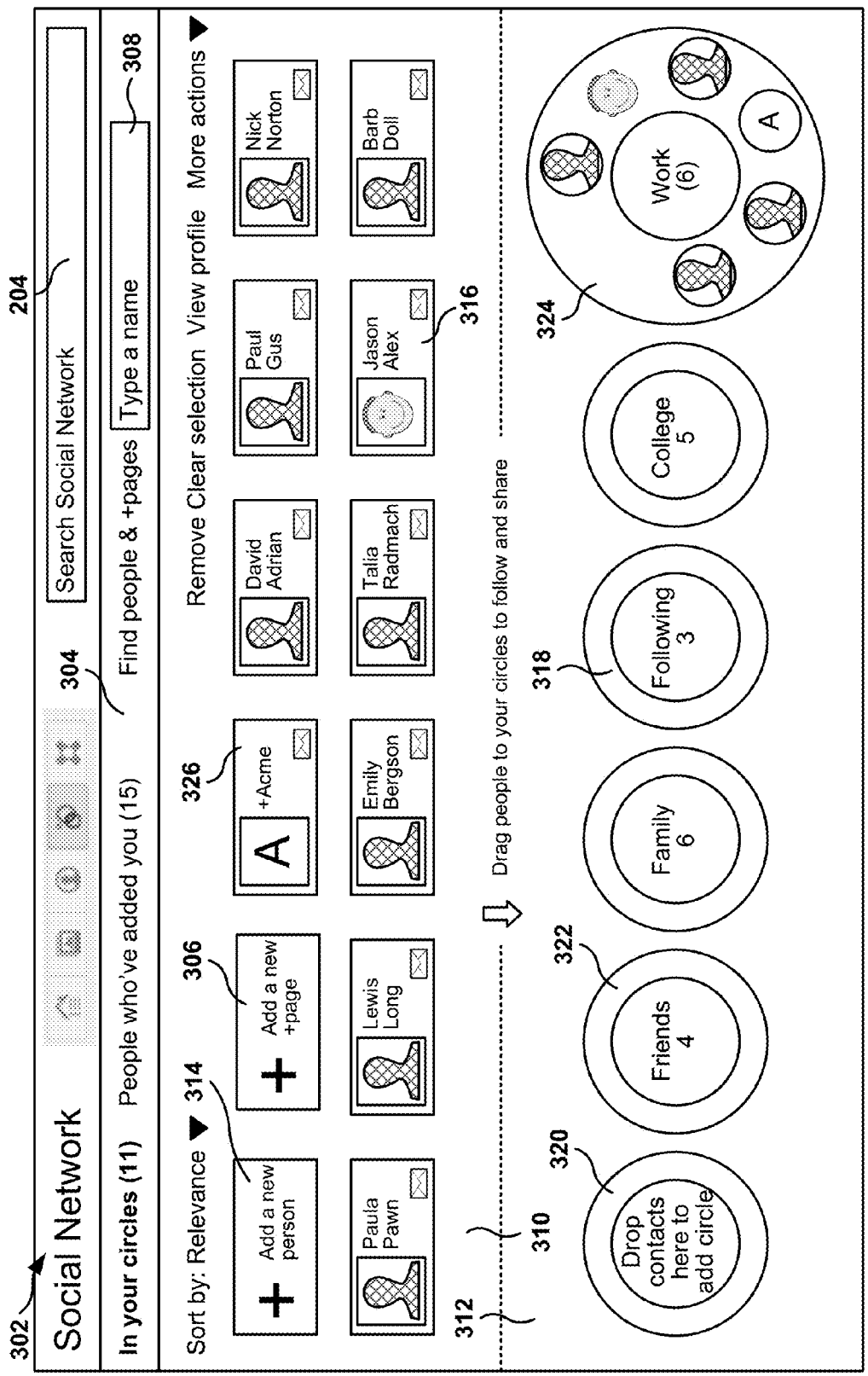
FIG. 3 is a web page for managing user groups within the social network, according to one implementation.

FIG. 3 is a web page 302 for managing user groups within the social network, according to one implementation. Bar 304 provides selections options for choosing users, which are then displayed in users area 310. In the implementation shown in FIG. 3, the person has selected the option "In your circles" to display users that are currently in the person's circles (e.g., user defined groups). A second option in bar 304 allows the selection of persons that have added the owner of the page to their groups in the social network. In addition, bar 304 includes an input field 308 to search for people or entities. In one implementation, the social network provides an option to follow other users anonymously. If a person follows another user anonymously, the person will be able to see the public posts of the user, and the person or entity being followed would not be aware that this person is following them.

User's area 310 displays icons, images, pictures or indicators associated with several users, and circles area 312 includes the groups defined by the user. In one implementation, the person is able to add users to the circles in circles area 312 by selecting a user icon, dragging the icon to the circles area 312, and dropping the icon in one of the circles. To delete a user from a circle, the user icon inside the circle is dragged from the circle and dropped outside the circle. In one implementation, when the person moves the mouse over a circle, the circle is enlarged to show the user icons corresponding to the users belonging to that circle. For example, after placing the mouse over circle 324, circle 324 is expanded, having now a larger size than the other circles, and presents the users currently in that circle. Other circles, such as circle 322 named "Friends," are presented in a smaller size than circle 324 and do not show their contents. To create a new circle, the person can drop a user from users area 310 in circle 320.

In one implementation, the social network creates a default circle for inclusion of entity pages. The implementation of FIG. 3 provides a circle 318 named "Following" for inclusion of entity pages. The entity pages do not have to be added to circle 318, and may be added to any of the circles defined by the person. In one implementation, persons and entities can also be added to more than one circle. In one implementation, when a person starts following an entity, the entity is automatically added to the "Following" circle, although the person may later remove the entity or move to another circle. In another implementation, when the decision is made to follow an entity, a drop down provides the user with options to add the entity to any one of the circles previously created by the user or to a following circle. This option allows for direct adding of users to circles, without first adding them to the following circle 318.

The users in user area 310 can be real persons (e.g., person 316 "Jason Alex") or can be entities (e.g., entity 326 "+Acme"). People are able to place real persons or entities in any of the circles below, and a circle may have just people, just entities, or a mix of people and entities.

In one implementation, user area 310 also includes a couple of selection boxes for adding persons 314 or entities (e.g., +pages) 306. When the person selects one of these boxes, options are presented to enter the name of a person or an entity, or to perform a search on the social network. In another implementation, a unique box is presented to search for people or entities. In one implementation, once the person enters a "+" sign as the first character of the search, the social network limits the search to entities. Otherwise, the search is limited to real persons. Again, it should be understood that any other symbol or token can be used to filter, identify or modify a search query.

Figure 4:
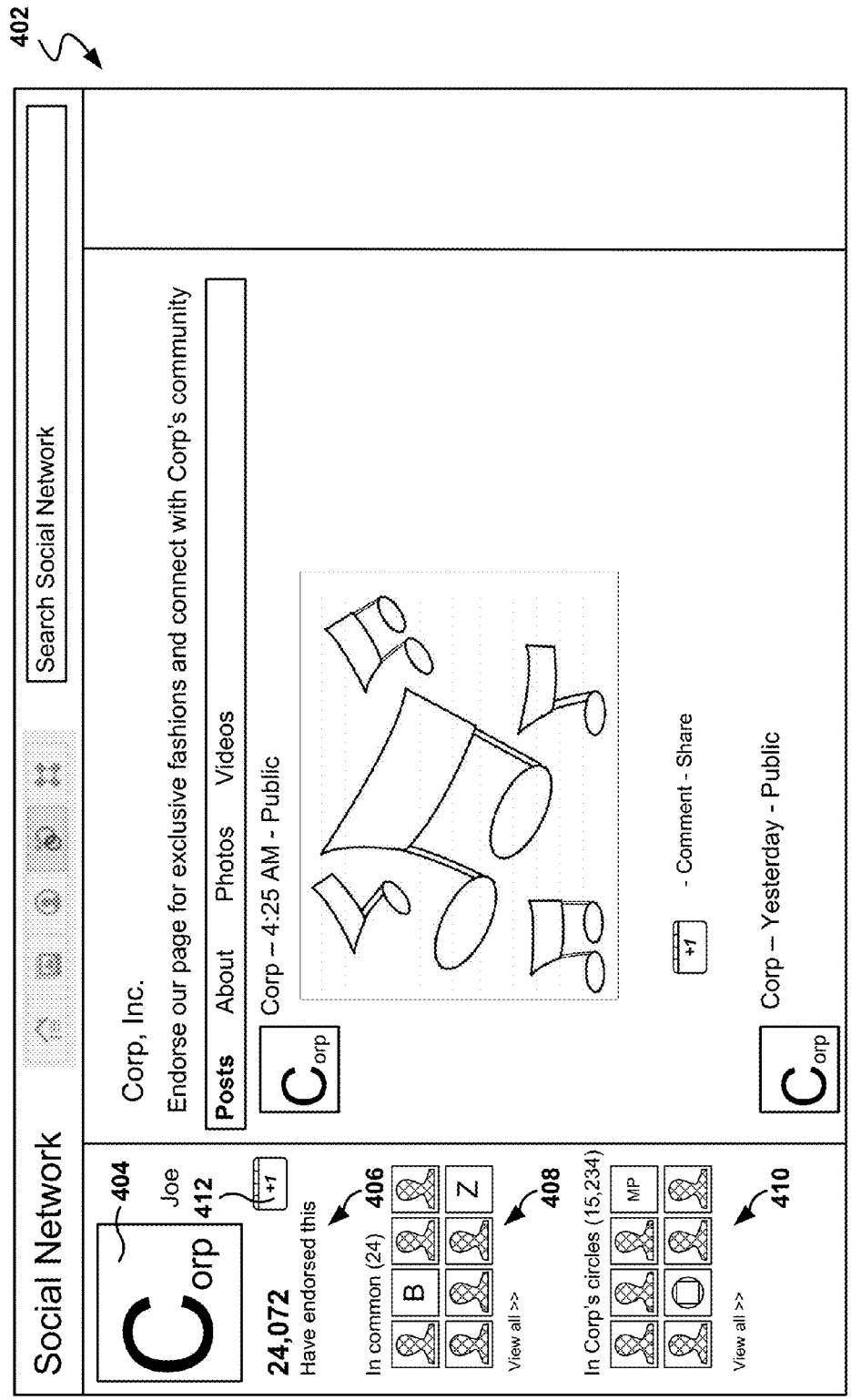
FIG. 4 shows a profile page of an entity in the social network, according to one implementation.

FIG. 4 shows the profile page 402 of an entity in the social network, according to one implementation. When a user clicks on the name of another user, the associated profile page for the user is presented. FIG. 4 shows the profile page of an entity. In the middle panel, posts from the entity that are visible to this user are presented, with a similar format to the posts shown in the stream of FIG. 3.

The profile page 402 includes a region that can accept an icon 404 associated with the entity and the name of the entity next to the icon 404. In addition, an endorsement button 412 gives the person or other entity an option for endorsing the entity associated with the profile page. Counter 406 provides information about the number of people or entities that have endorsed this entity. In one implementation, the profile page of a person may not include endorsement button 412. In another implementation, the social network allows for the endorsement of real people, and an endorsement button is available to endorse people.

Profile page 402 also includes information about users 408 in the user's circles that are also following this entity, e.g., users "in common" following this entity. This information helps the entity improve its corporate image by showing related users that also are associated with the entity. In addition, information 410 is provided about users or entities of the social network that are in the entity's circles but that are not currently in any of the user's circles.

In one implementation, the social network enforces a privacy mechanism, e.g., a policy, to protect people from undesired messages. In one implementation, the policy defines two types of users: people and entities. The communication rules in the social network are different for people and for entities. A person may initiate contact with an entity, but the entity may not initiate contact with the person. Once the person establishes a social link with the entity (e.g., the person adds the entity to one or more circles), then the entity may start communicating with the person. In one implementation, an entity may initiate contact with other entities (of course, subject to user privacy settings), but not with real people (e.g., user accounts). This policy puts the person in command of the communication flow between people and entities.

In one implementation, the privacy policy defines that people may not have automatic acceptance of tags for photos posted on the social network by entities. However, there can be automatic acceptance of tags from entities by other entities.

Figure 5:
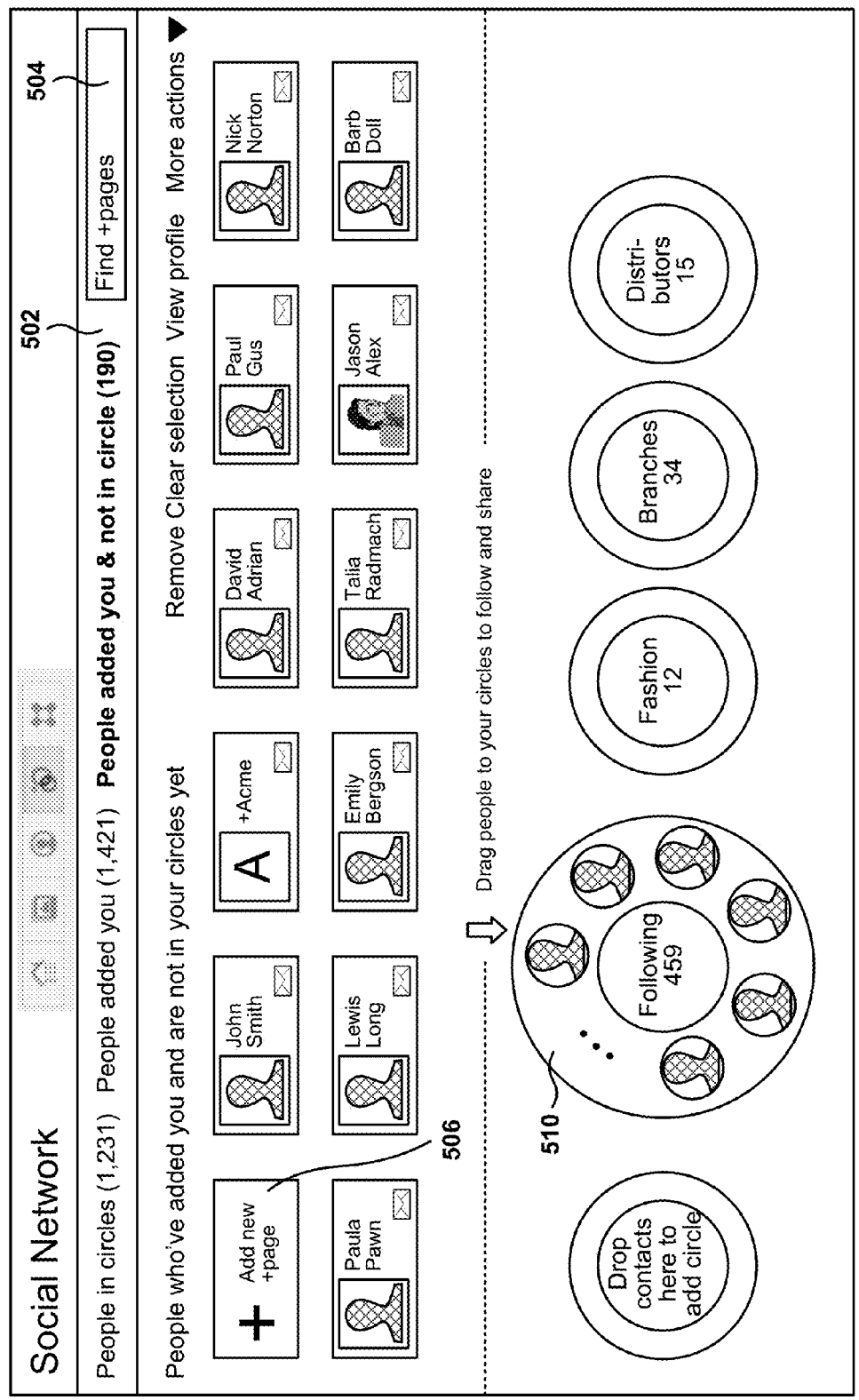
FIG. 5 is a web page for the management of user groups by an entity, according to one implementation.

FIG. 5 is a web page for the management of user groups by an entity, according to one implementation. Bar 502 for selecting users includes options for showing people already in the entity's circles, showing people that are following the entity, and showing people that are following the entity and not yet in a circle. The search box 504 is different from the search box 308 of FIG. 3 because an entity cannot search for people, or be allowed to find people to first approach. An entity may only search for other entities (e.g., +pages). Additionally, because the entity may not search for people, the circle editor for entities does not include the icon 314 of FIG. 3 to add new persons. Entities are only provided with icon 506 to add other entities. Although the functions of this mechanic are described with reference to icons that are present or not present, other icons, text, windows, selection features may be used.

In one implementation, the social network provides a default circle 510 to the entity for adding users followed by the entity. Circle 510, named "Following" in the sample of FIG. 5, is intended to be used for adding users that are being followed by the entity, in response to the person's initiated following of the entity. However, the entity may add other circles and organize the users followed as desired by the administrator of the entity page. For example, the implementation of FIG. 5 illustrates a page that includes, besides the Following circle 510, a Fashion circle (e.g., to include other related companies in the fashion industry), a branches circle (e.g., to include retail outlets for the entity), and a Distributors circle (e.g., to include the distributors that carry the entity's products).

The entity may add each user to more than one circle. For example, the entity might create circles by geographic location in order to better target marketing messages (e.g., United States, South America, Europe, Asia, etc.), or may create circles according to demographic criteria (e.g., 5-15 years old, 16-25, 25-50, and 51+). The number and type of circles (e.g., groups) created by the entity are limitless. The circles can be created for limited times, and people can be dynamically moved by the entity or an algorithm set by the entity.

In one implementation, the social network provides an automatic creation of circles, based on the parameters selected by the entity and executed by the algorithm, or based on user characteristics. In one implementation, this feature is referred to as suggested circles. Each suggested circle is associated with a respective one or more attributes, such as geographic location, age range, gender, language, country, etc. When a person first starts following an entity, the person is automatically added to the entity's suggested circles that match the person's characteristics. For example, a person is added to a circle for the city of San Jose if the person lives in San Jose, the person is added to a circle for ages from 10 to 20 if the person is 19 years old, the person is added to a circle for United States if the person lives in the United States, etc.

It is noted that each person is added to suggested circles when the person has provided the corresponding information to the social network (e.g., provided the information to the user profile) and the person has allowed the social network to use this or part of the information for selection of people to be added to the corresponding circles. In one implementation, the content of the suggested circles is not available for inspection by the entity. This way, the entity does not receive information about the person, although the entity can target its marketing messages to the appropriate segments due to the infrastructure provided by the suggested circles.

The mechanic of suggested circles, in one implementation, is transparent to people, and settable by administrative functions of the entity. For example, a person might receive a message from a company, but the person does not know why she received the message. The reason the person received the particular message may be, for example, because the entity decided to send that message to all of the people or entities that were part of one of their circles. As another example, the entity may decide to move certain people and entities into a circle for an upcoming event. Before the event, the entity can set a campaign to notify those people and entities regarding information, specials, coupons, etc., as it pertains to the upcoming event. Once the event is done, the entity can manually move the people and entities back to their originally established default circles. In still another implementation, the users that were added to the event circle can simply be copied (as a second instance) to the event circle. When the event is done, the event circle is deleted. The users, however, are still present in their previously defined circles of the entity.

In another implementation, the suggested circles are administered by the entity because the social network provides information about the person to the entity (of course, the person's information (or only certain specific information) provided must be approved by the person). In one implementation, the entity is able to manually assign people to suggested circles according to their characteristics in order to customize marketing communications or any other type of communication.

FIG. 6 illustrates a broad level illustration of users, including entities and people users that have accounts in a social network, in accordance with one implementation of the present disclosure. In the illustrated example, each of the users, including entities, will have data associated with their account stored in a database 600. Database 600 is, in one implementation, defined by a plurality of rows. Each of the rows may have corresponding columns that identify the type of data to be stored in each of the cells of a row. In another implementation, each cell in a row may be defined with a different structure, such that columns are not associated with a fixed type of data. In one example, as the number of connections in the social grid of a particular account increases, the row associated with the account will correspondingly grow.

In the example illustrated, entity +A is shown to store its data in row R2, user 1 U1 is shown to store its data in row R4. U2 is shown to store its data in row R3, and user UN is shown to store its data in row Rn. As the social network grows, more user accounts will establish different rows in database 600. The size of the data stored in each row will also increase as the number of connections in the social network increase. As will be described below with respect to FIG. 7, data stored in each row may include edge data. Edge data represents connections between users in the social network. For example, the edge data can include information regarding which user has added particular users to their circles, and information regarding the privacy rules associated with those users in particular circles. This data, based on interactions between users, is therefore stored in the particular row in database 600.

Database 600 is shown as a single database, however, it should be understood that database 600 can be a distributed database across a large-scale network. Users accessing the database across the world can therefore access various instances of database 600, and their corresponding rows. Accordingly, the rows associated with each user can scale based on the size of the associations between a particular user and other users. By managing this information in each row for a particular account, it is possible to examine a particular row in the database 600 to identify connections between other users, as well as privacy settings associated with the relationships established by a particular user. Other implementations are possible. For example, the data can be stored in structures other than a database or other than in the form of rows, e.g., as directed graphs.

FIG. 7 illustrates an example of a relationship between user U1 and user U2, in accordance with one implementation of the present disclosure. This relationship will therefore establish edges in the rows of each of the respective users. In the example, user U1 has added user U2 to one of its circles, and user U2 has also added user U1 to one of its circles. However, it should be appreciated that it is possible for the relationship between user U1 and user U2 to be single directional. That is, it is possible that one of the users adds the other user to one of its circles, but the other user does not add the first user to its circles.

In that case, only one arrow between user U1 and user U2 is made. But, in the illustrated example, each of the users U1 and U2 have added each other to their circles. In such a situation, the rows of each of the users in the database 600 will also reflect the respective relationships by containing edge data in the respective rows, as illustrated herein. For example, the row R4 is associated with user U1 and the row R3 is associated with user U2. When user U1 adds user U2 to one of its circles, and outgoing edge OGE (U2) is defined and stored in R4, and an incoming edge ICE (U1) is received by user U2 and stored in R3.

In a similar manner, when user U2 adds user U1 to its circles, an outgoing edge OGE (U1) is defined and stored in R3, and an incoming edge ICE (U2) is received by user U1 and stored in R4. Using this nomenclature, and mechanic for storing data to rows of each account of a particular user, it is possible to maintain a graph of the relationships of any particular user with any other user in the social graph when a relationship is present.

Figure 8:
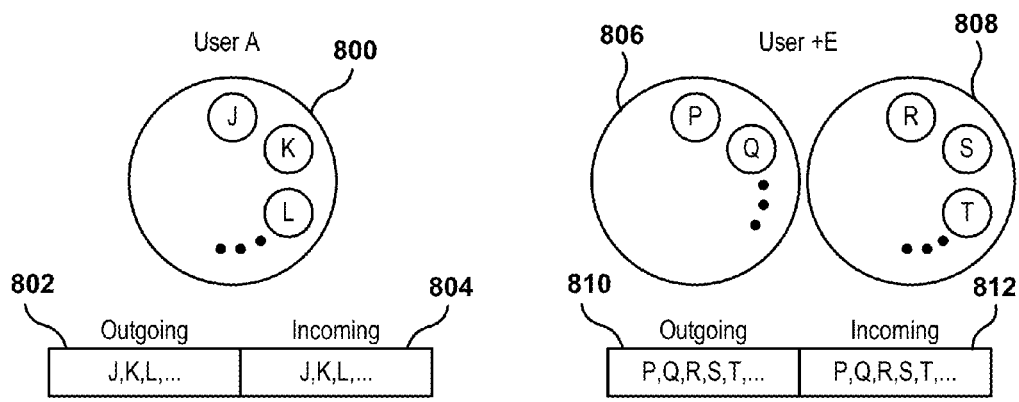
FIG. 8 conceptually illustrates a person user and an entity user and their corresponding circles and edge data rows.

FIG. 8 conceptually illustrates a person user and an entity user and their corresponding circles and edge data rows. Shown at left is a user A's circle 800, in which users J, K, and L are included. The circle 800 includes users which user A is following, and is defined by outgoing edge data 802. The outgoing edge data 802 includes data describing the users J, K, and L as members of user A's circle 800. It will be appreciated that the outgoing edge data 802 defines users that have been added by user A to a circle, and in the case of user A having more than one circle, the outgoing edge data can define one or more of user A's circles of which a particular user is a member. An added user can also be part of multiple circles. For ease of explanation, in the presently illustrated implementations, outgoing edge data is shown in a simplified manner, indicating which users have been added to a circle. However, it should be appreciated that outgoing edge data can include a variety of additional information, including data indicating one or more circles to which a user has been added, and additional data in accordance with various implementations described herein.

User A's incoming edge data 804 includes data defining other users that have added user A to at least one of their circles. In the illustrated implementation, the incoming edge data 804 indicates that users J, K, and L, have each added user A to at least one of their circles. As users J, K, and L are included as members of user A's circle 800, the relationship between user A and each of users J, K, and L can be characterized as mutual following of each other.

With continued reference to FIG. 8, shown at right are circles of an entity user +E, along with entity user +E's edge row data. Users P and Q are members of entity user +E's circle 806, and users R, S, and T are members of entity user +E's circle 808. These circle memberships are defined by entity user +E's outgoing edge data 810, which indicates users P, Q, R, S, and T as members of entity user +E's circles. Entity user +E's incoming edge data 812 indicates that users P, Q, R, S, and T have each added entity user +E to their circles. Thus, entity user +E and each of users P, Q, R, S, and T are mutually following each other.

Figure 9:
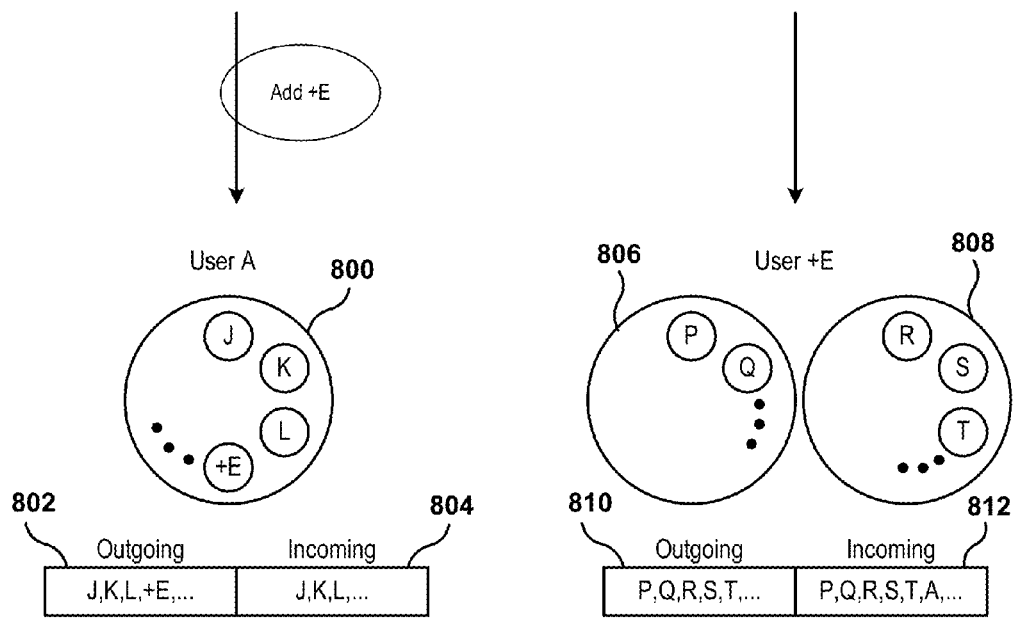
FIG. 9 illustrates the addition of an entity user to a user's circle.

FIG. 9 illustrates the addition of entity user +E to user A's circle 800. To effect this change, user A's outgoing edge data 802 is updated to indicate the addition of entity user +E to user A's circle 800. Also, the incoming edge data 812 of entity user +E is updated to indicate user A as a follower of entity user +E. As the members of particular user's circles are defined based on that user's outgoing edge data, the net result is that entity user +E has been added to user A's circles, and more specifically to user A's circle 800.

In some implementations, it is desirable to define preconditions for the addition of a secondary user to a primary user's social graph. For example, in some implementations, an entity user cannot add a non-entity user to their social graph unless the non-entity user has first added the entity user to his social graph. Such a policy may provide a measure of privacy protection for non-entity users of a social network, as against entity users that may have an interest in adding non-entity users to their social graphs. However, implementation of such dependencies can lead to inconsistencies if multiple parties are allowed to mutate the same data, as discussed in further detail below.

Figure 10:
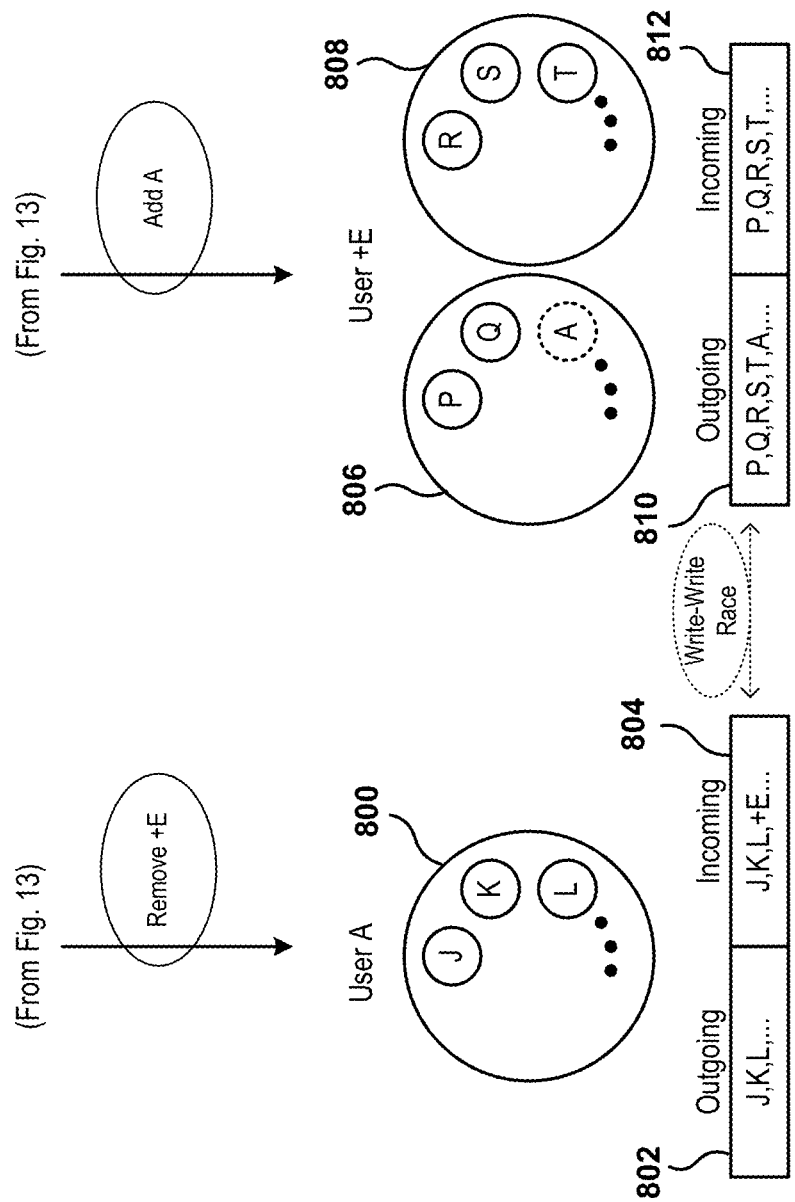
FIG. 10 illustrates the substantially simultaneous removal of an entity user from a user's social graph, and the addition of the user to the entity user's social graph.

Continuing from the scenario described at FIG. 9, FIG. 10 illustrates the substantially simultaneous removal of entity user +E from user A's social graph, and the addition of user A to entity user +E's social graph. To effect removal of entity user +E from user A's circle 800, user A's outgoing edge data 802 is updated to remove the indication of entity user +E as a circle member, and the incoming edge data 812 of the entity user +E is also updated to remove the indication of user A as a follower of entity user +E. Entity user +E is not permitted to add user A to their circles unless user A has first added entity user +E to his circles. (In some implementations, addition by user A of entity user +E to his circles triggers a notification to, or is otherwise visible to, entity user +E, who may in turn add user A to their social graph.) Because of this dependency, removal of entity user +E from user A's social graph can also entail removal of user A from entity user +E's circles if such membership exists. In the presently described scenario, this is not the case. However, if user A was a member of entity user +E's circles, then additional operations would be performed to remove any indication of user A as a circle member from entity user +E's outgoing edge data 810, and remove any indication of entity user +E as a follower from user A's incoming edge data 804.

To determine whether user A has first added entity user +E to his circles, a check is performed of entity user +E's incoming edge data to determine if user A is following entity user +E. If user A is not indicated as a follower, then entity user +E cannot add user A to their circles. Thus, if user A's removal of entity user +E from his circles, as effected through deletion of the indication of circle membership in user A's outgoing edge data 802 and deletion of the indication of follower status in entity user +E's incoming edge data 812, is completed before the request to add user A to entity user +E's circles is serviced, then entity user +E will not be permitted to add user A to their circles.

However, due to substantially simultaneous timing of the request to remove entity user +E from user A's social graph and the request to add user A to entity user +E's social graph, it may be the case that the request to add user A is permitted because the request to remove entity user +E has not been completed yet. A write-write "race" would then ensue as both requests may affect the same data. Specifically, both requests would potentially affect the entity user +E's outgoing edge data 810 and the user A's incoming edge data 804 in opposite ways. Namely, the request to add user A to entity user +E's circles would result in writing of user A to the entity user +E's outgoing edge data 810 and writing of entity user +E to user A's incoming edge data 804, while the request to remove entity user +E from user A's circles would result in deletion of such data. However, if the write activity of each request does not occur in this order, then the result would be that user A is added to outgoing edge data 810 and entity user +E is added to incoming edge data 804, thereby defining user A as a member of entity user +E's circles, despite the existence of a request to remove entity user +E from user A's circles which should have produced a contrary result. The result is shown at FIG. 10 by the indication of user A having been added to entity user +E's circle 806, while entity user +E has been removed from user A's circle 800.

Figure 11:
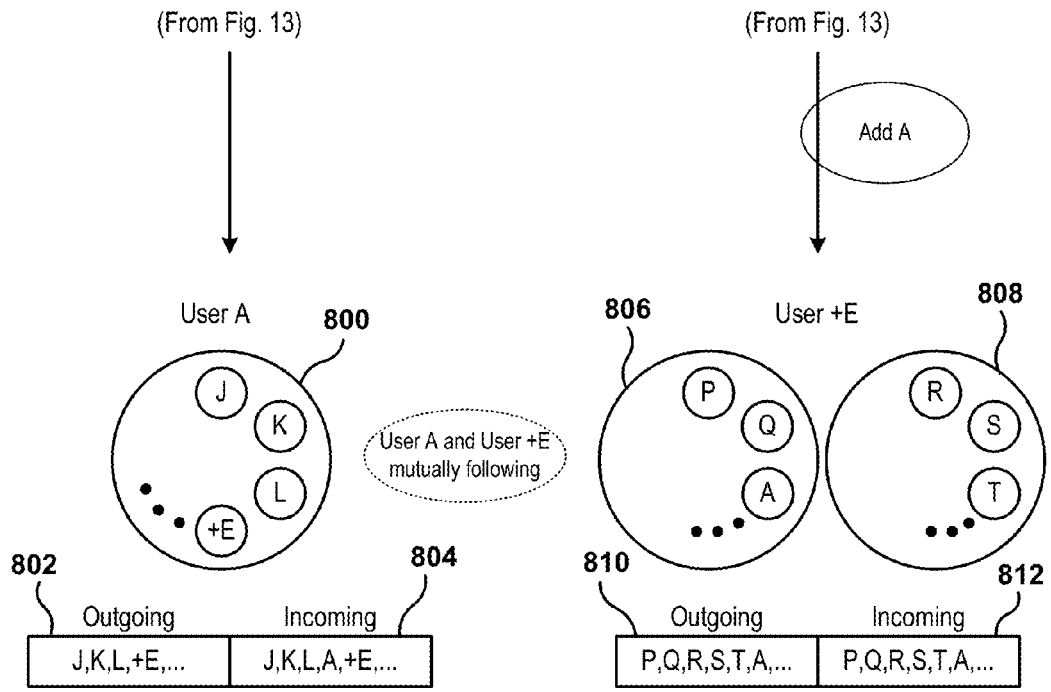
FIG. 11 illustrates a scenario in which an entity user requests to add a user to their social graph.

FIG. 11 illustrates another scenario, continuing from that described at FIG. 9, in which entity user +E requests to add user A to their social graph. Entity user +E may have become aware of user A's having added entity user +E to his social graph based on notification resulting from the addition itself, or resulting from some other communication initiated by user A. As noted above, in order for entity user +E to add user A to their circles, user A is required to have first added entity user +E to his circles. Therefore, a check is first performed to determine that entity user +E is a member of user A's circles. This can be determined from examination of entity user +E's incoming edge data 812, which reveals that user A is a follower of entity user +E and therefore has entity user +E as a member of his circles. As the precondition for servicing the request to add user A is met, then the actual addition of user A to entity user +E's circles is effected through addition of user A to entity user +E's outgoing edge data 810, and addition of entity user +E to user A's incoming edge data 804. The net result is that user A and entity user +E each have the other in their circles, and can thus be characterized as mutually following one another.

Figure 12:
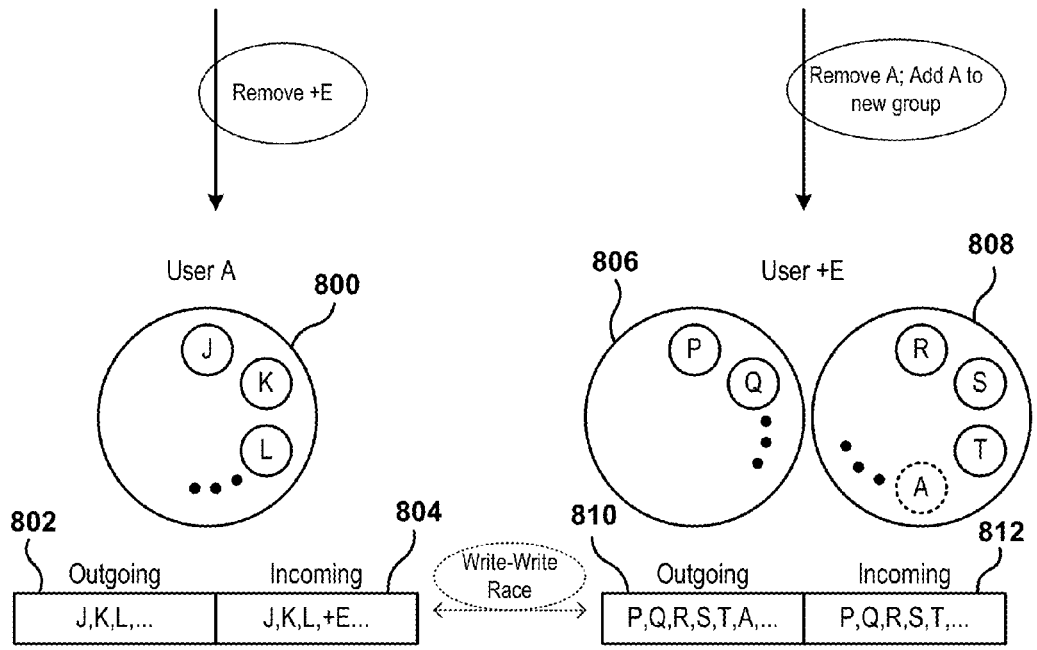
FIG. 12 illustrates the potential effect of substantially simultaneous conflicting requests from a user and an entity user.

Continuing from the scenario described at FIG. 11, FIG. 12 illustrates the potential effect of substantially simultaneous conflicting requests. Specifically, a request is made to remove entity user +E from user A's circles, while substantially simultaneously, a request is made to remove user A from entity user +E's circle 806 and add user A to circle 808. As with the scenario described at FIG. 10, it may occur that the request to add user A to a new group is permitted despite the request to remove entity user +E, due to the substantially simultaneous nature of the requests and because they may affect the same data. Again, a write-write "race" would result, with the order of write operations based on the conflicting requests determining the final outcome. The potential result is that despite the request to remove entity user +E from user A's circles, user A may nonetheless be added to entity user +E's circle 808, in violation of the requirement that entity user +E not be able to add user A unless user A has first added entity user +E. This result is shown at FIG. 12, as user A has been removed and readded to entity user +E's outgoing edge data 810, with entity user+E being added to user A's incoming edge data 804. The entity user +E's outgoing edge data 810 defines user A as a member of entity user +E's circle 808.

Figure 13:
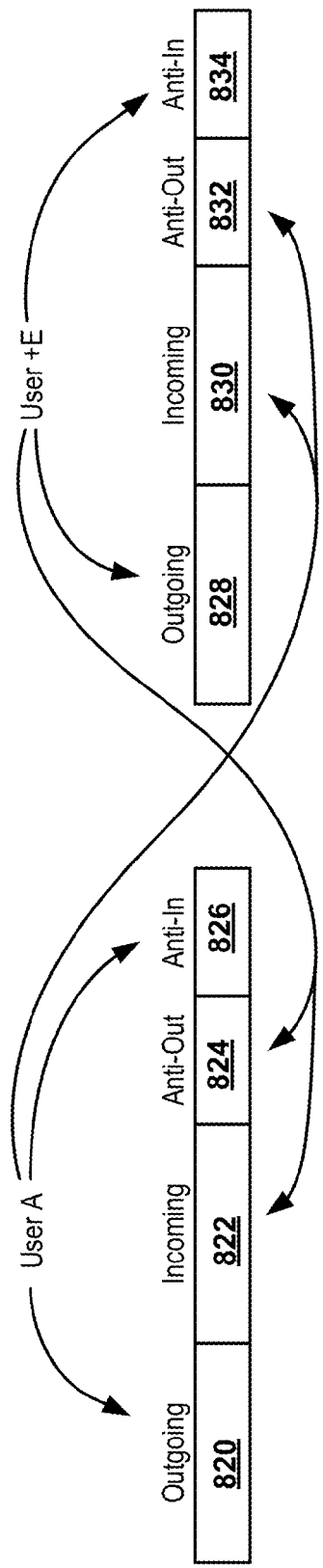
FIG. 13 illustrates the edge data rows of a user and an entity user, which are defined to include anti-membership fields.

To avoid the inconsistencies that may result from permitting requests originating from different users to affect the same data, an edge data row configuration is presented in which anti-membership fields are established. FIG. 13 illustrates the edge data rows of user A and entity user +E, which are defined to include anti-membership fields. User A's edge data row includes outgoing edge data 820, incoming edge data 822, anti-outgoing edge data 824, and anti-incoming edge data 826. Entity user +E's edge data row includes outgoing edge data 828, incoming edge data 830, anti-outgoing edge data 832, and anti-incoming edge data 834.

The presence of data designating a user in one of the anti-membership fields negates the circle membership or follower status that would otherwise be established by the designation of that user in a corresponding edge data field. In other words, circle membership or follower status is determined by examining both an edge data field and its corresponding anti-membership field. With continued reference to FIG. 13 by way of example, a given user will be determined to be a member of user A's social graph if the given user is indicated in user A's outgoing edge data 820, and the given user is not indicated in user A's anti-outgoing edge data 824. If the given user is indicated in user A's anti-outgoing edge data 824, then membership in user A's social graph is not established even if the given user is indicated in user A's outgoing edge data 820. In a similar manner, a given user is determined to be a follower of user A is the given user is indicated in user A's incoming edge data 822, and the given user is not indicated in user A's anti-incoming edge data 826. If the given user is indicated in user A's anti-incoming edge data, then the given user will not be determined to be a follower of user A, even if the given user is indicated in user A's incoming edge data 822. A similar membership/follower determination schema is established for entity user +E, with circle membership established by designation in user +E's outgoing edge data 828 simultaneous with no designation in user +E's anti-outgoing edge data 832, and follower status established by designation in user +E's incoming edge data 830 simultaneous with no designation in user +E's anti-incoming edge data 834.

For a given user's edge data row, each of the outgoing edge data, incoming edge data, anti-outgoing edge data, and anti-incoming edge data, is modifiable as a result of requests originating from either the given user or a secondary user, but not both. With continued reference to FIG. 13 by way of example, a request from user A may result in modification of user A's outgoing edge data 820 and anti-incoming edge data 826, but not the incoming edge data 822 or the anti-outgoing edge data 824. Such a request may also result in modification of the incoming edge data or anti-outgoing edge data of a secondary user, e.g. user +E's incoming edge data 830 and anti-outgoing edge data 832. Likewise, a request from entity user +E may result in modification of user +E's outgoing edge data 828 and anti-incoming edge data 834, but not user +E's incoming edge data 830 and anti-outgoing edge data 832. However, such a request may modify the incoming edge data or anti-outgoing edge data of another user, e.g. user A's incoming edge data 822 or anti-outgoing edge data 824. This configuration establishes modification of edge data fields by either of a primary user or a secondary user, but not both, thereby avoiding the potential for write-write "races" between conflicting commands. The operation of these edge data rows in various scenarios will now be described.

FIG. 14 illustrates circle membership and follower status for user A and entity user +E, as established by edge data rows. User A's outgoing edge data 820 includes users J, K, and L, while user A's anti-outgoing edge data 824 does not includes any of these users. Therefore, users J, K, and L are established as members of user A's social graph, and more specifically as members of user A's circle 800. Additionally, user A's incoming edge data 822 includes users J, K, and L, and user A's anti-incoming edge data 826 does not include any of these users. Therefore, users J, K, and L are determined to be followers of user A (users J, K, and L having added user A to their social graphs, i.e. to at least one of their circles).

Entity user +E's outgoing edge data 828 includes users P, Q, R, S, and T, while entity user +E's anti-outgoing edge data 832 does not include any of these users. Therefore, users P, Q, R, S, and T are determined to be members of entity user +E's circles. In the illustrated implementation, user P and Q are members of entity user +E's circle 806, while users R, S, and T are members of entity user +E's circle 808. Entity user +E's incoming edge data 830 includes users P, Q, R, S, and T, while entity user +E's anti-incoming edge data 834 does not include these users. Therefore, users P, Q, R, S, and T are determined to be followers of entity user +E.

FIG. 15 illustrates addition of entity user +E to user A's circles, continuing from the scenario described at FIG. 14. When user A requests to add entity user +E to his social graph, the entity user +E is added to user A's outgoing edge data 820. Optionally, a check may be first performed to ensure that entity user +E is not designated in user A's anti-outgoing edge data 824, which would negate circle membership if present. In the illustrated implementation, no such designation exists, and entity user +E is added to user A's outgoing edge data 820, thereby establishing entity user +E as a member of user A's circles, specifically circle 800. Additionally, user A is added to entity user +E's incoming edge data 830. Optionally, a check may first be performed to ensure that user A is not designated in entity user +E's anti-incoming edge data 834, which would negate follower status if present. In the illustrated implementation, no such designation exists, and user A is therefore established as a follower of entity user +E by virtue of user A's inclusion in entity user +E's incoming edge data 830. As has been noted, the addition by user A of entity user +E to user A's circles or establishment of user A as a follower of entity user +E may trigger notification or be otherwise made known or visible to entity user +E.

Figure 16:
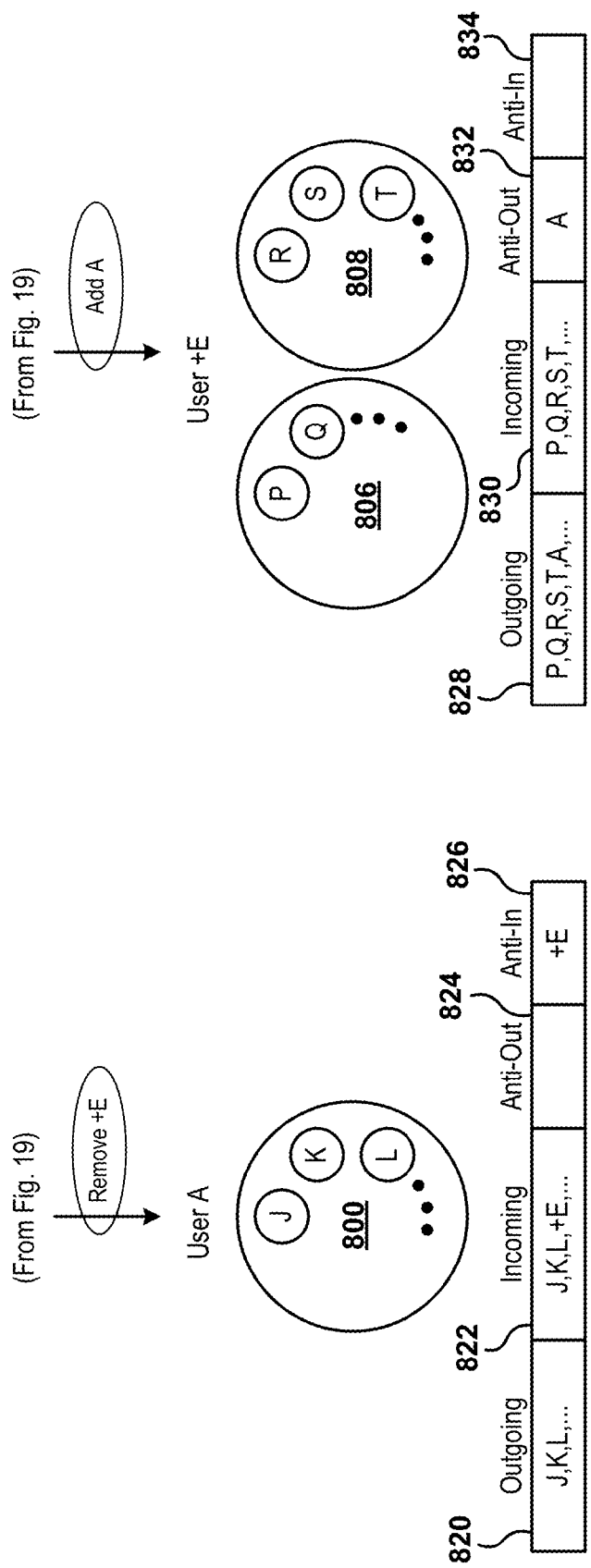
FIG. 16 illustrates the effect of substantially simultaneous requests from a user and an entity user.

Continuing from the scenario described at FIG. 15, FIG. 16 illustrates the effect of substantially simultaneous requests from user A and entity user +E. In the illustrated implementation, user A has requested to remove entity user +E from his circles, while entity user +E has substantially simultaneously requested to add user A their circles. User A's request to remove entity user +E from his circles results in the following actions: removal of entity user +E from user A's outgoing edge data 820, removal of user A from entity user +E's incoming edge data, addition of user A to entity user +E's anti-outgoing edge data 832, and addition of entity user +E to user A's anti-incoming edge data 826. The first action effects removal of entity user +E from user A's circles. The second action effect removal of user A as a follower of entity user +E. The third action prevents addition of user A to entity user +E's circles. And the fourth action prevents the addition of entity user +E as a follower of user A.

Therefore, even if entity user +E's request to add user A is permitted, and user A is added to entity user +E's outgoing edge data 828 and entity user +E is added to user A's incoming edge data 822, the result will not establish user A as a member of entity user +E's circles nor entity user +E as a follower of user A. This is due to the inclusion of user A in entity user +E's anti-outgoing edge data 832, which negates the circle membership that would otherwise be established by adding user A to outgoing edge data 828, and the inclusion of entity user +E in user A's anti-incoming edge data 826, which negates the follower status that would otherwise be established by adding entity user +E to incoming edge data 822. Thus, even if the conflicting requests are both permitted, the end result is consistent with the desired outcome of removing entity user +E from user A's circles and preventing user A from being added to entity user +E's circles, and by extension preventing entity user +E from becoming a follower of user A.

Figure 17:
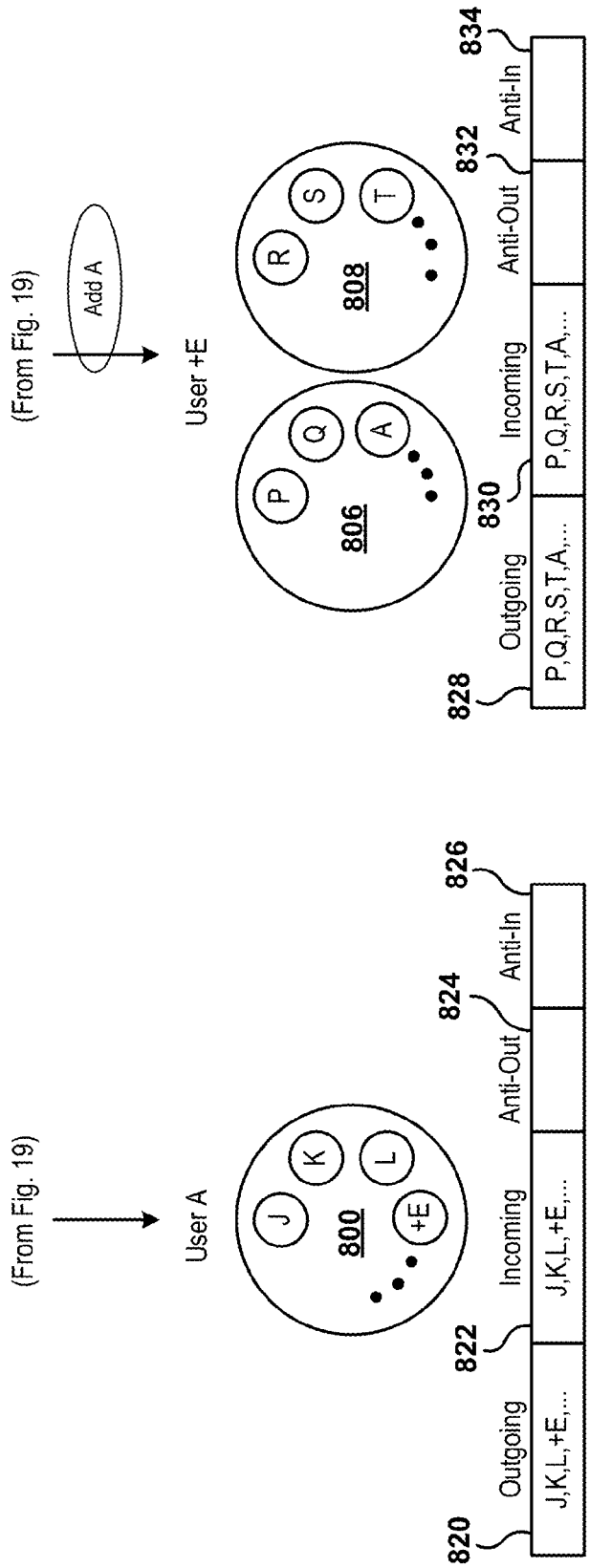
FIG. 17 illustrates a scenario in which an entity user requests to add a user to their circles.

FIG. 17 illustrates another scenario continuing from that described at FIG. 15, in which entity user +E requests to add user A to their circles. In the illustrated implementation, entity user +E is made aware of user A having added entity user +E to his circles or that user A is a follower of entity user +E. Entity user +E thus requests to add user A to their circles. To effect this change, user A is added to entity user +E's outgoing edge data 828, and entity user +E is added to user A's incoming edge data 822. As user A is not designated in entity user +E's anti-outgoing edge data 832, the addition of user A to entity user +E's outgoing edge data thereby establishes user A's membership in entity user +E's circles, specifically circle 806. And as entity user +E is not designated in user A's anti-incoming edge data 826, the addition of entity user +E to user A's incoming edge data 822 establishes entity user +E as a follower of user A.

Figure 18:
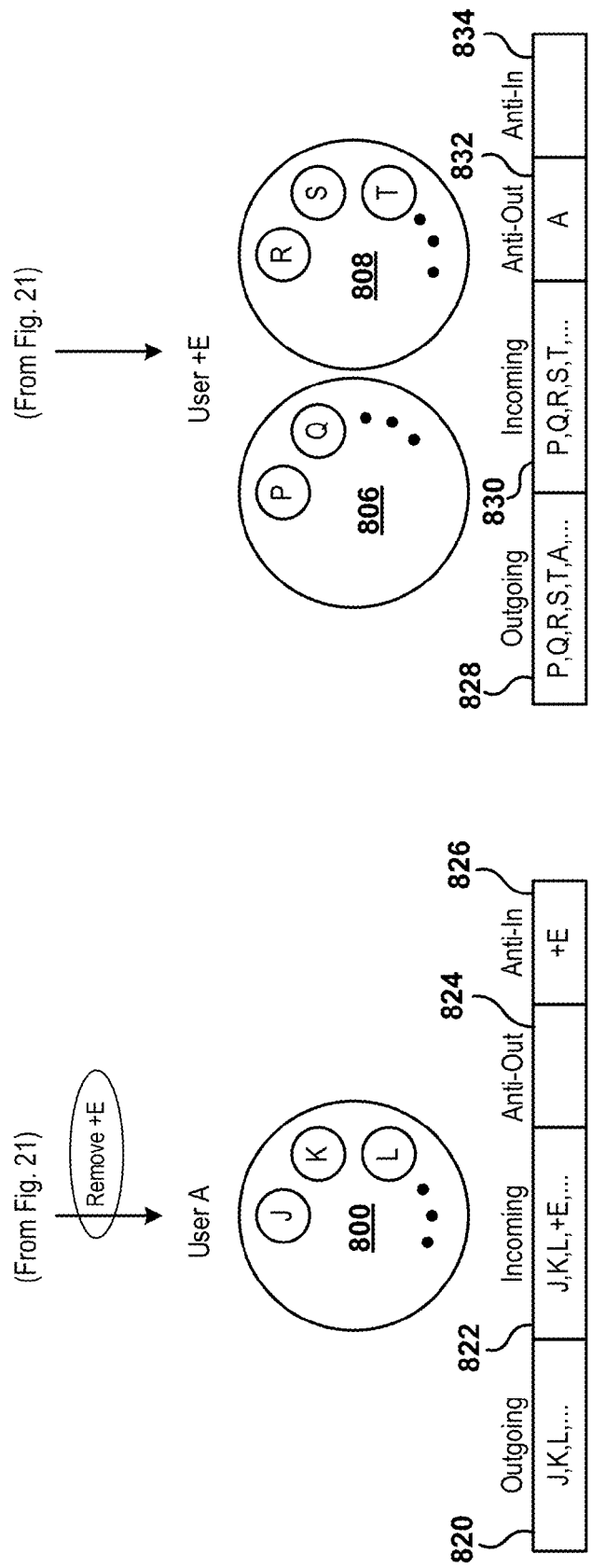
FIG. 18 illustrates the effect of a user request to remove an entity user from his social graph.

Continuing from the scenario described at FIG. 17, FIG. 18 illustrates the effect of user A requesting to remove entity user +E from his social graph. In response to the request, entity user +E is removed from user A's outgoing edge data 820, and entity user +E is removed from entity user +E's incoming edge data 830, which respectively effects removal of entity user +E from user A's circles and removal of user A as a follower of entity user +E. However, the request originating from user A is not able to directly affect entity user +E's outgoing edge data 828 which still includes user A, nor user A's incoming edge data 822 which still includes entity user +E. Therefore, also in response to the request, the user A is added to entity user +E's anti-outgoing edge data 832, and entity user +E is added to user A's anti-incoming edge data 826. The designation of user A in entity user +E's anti-outgoing edge data 832 negates the circle membership that would otherwise be established by the inclusion of user A in entity user +E's outgoing edge data 828. And the designation of entity user +E in user A's anti-incoming edge data 826 negates the follower status that would otherwise be established by the inclusion of entity user +E in user A's incoming edge data 822. It should be appreciated that the resulting configuration of edge data rows is similar to that described at FIG. 16, which resulted from conflicting requests.

Additionally, if after removing entity user +E from user A's circles, user A then decides to re-add entity user +E to his circles, then the previously described data changes are reversed. That is, entity user +E is added back to user A's outgoing edge data 820, user A is added back to entity user +E's incoming edge data, the designation of user A in entity user +E's anti-outgoing edge data is deleted, and the designation of entity user +E in user A's anti-incoming edge data is deleted. These changes reestablish the entity user +E as a member of user A's circles, and user A as a follower of entity user +E.

Figure 19:
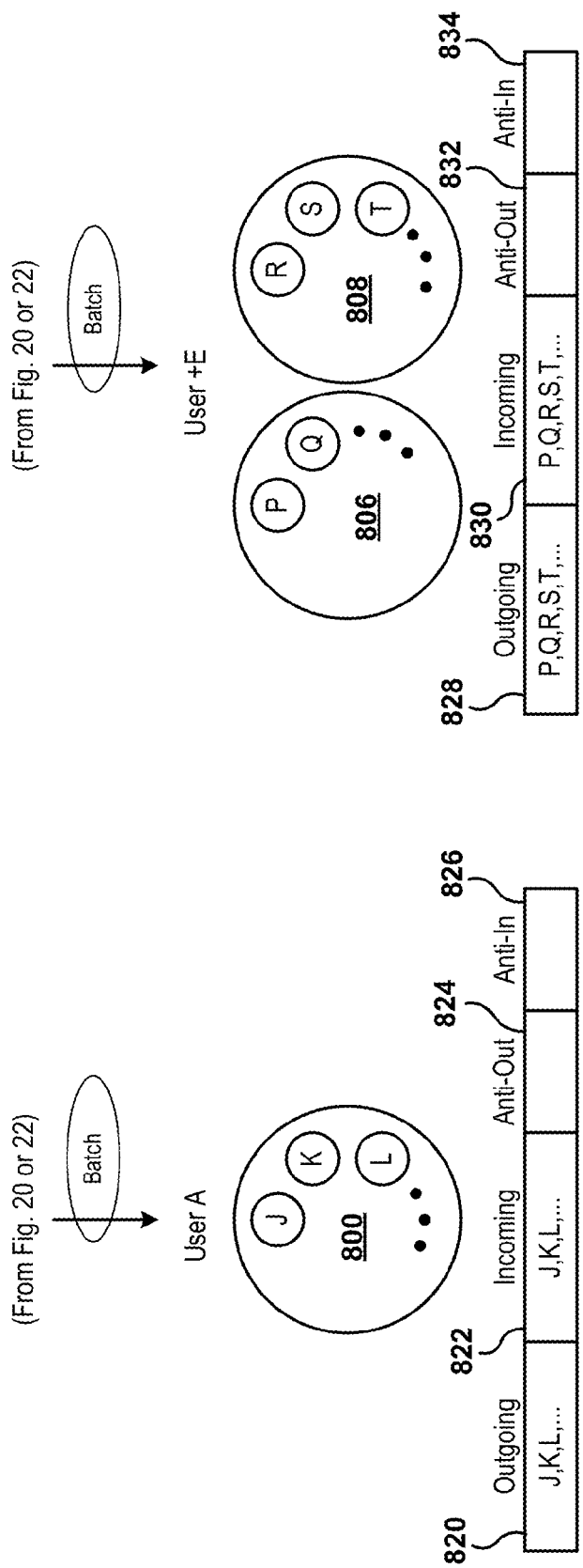
FIG. 19 illustrates the operation of a batch process.
Figure 22:
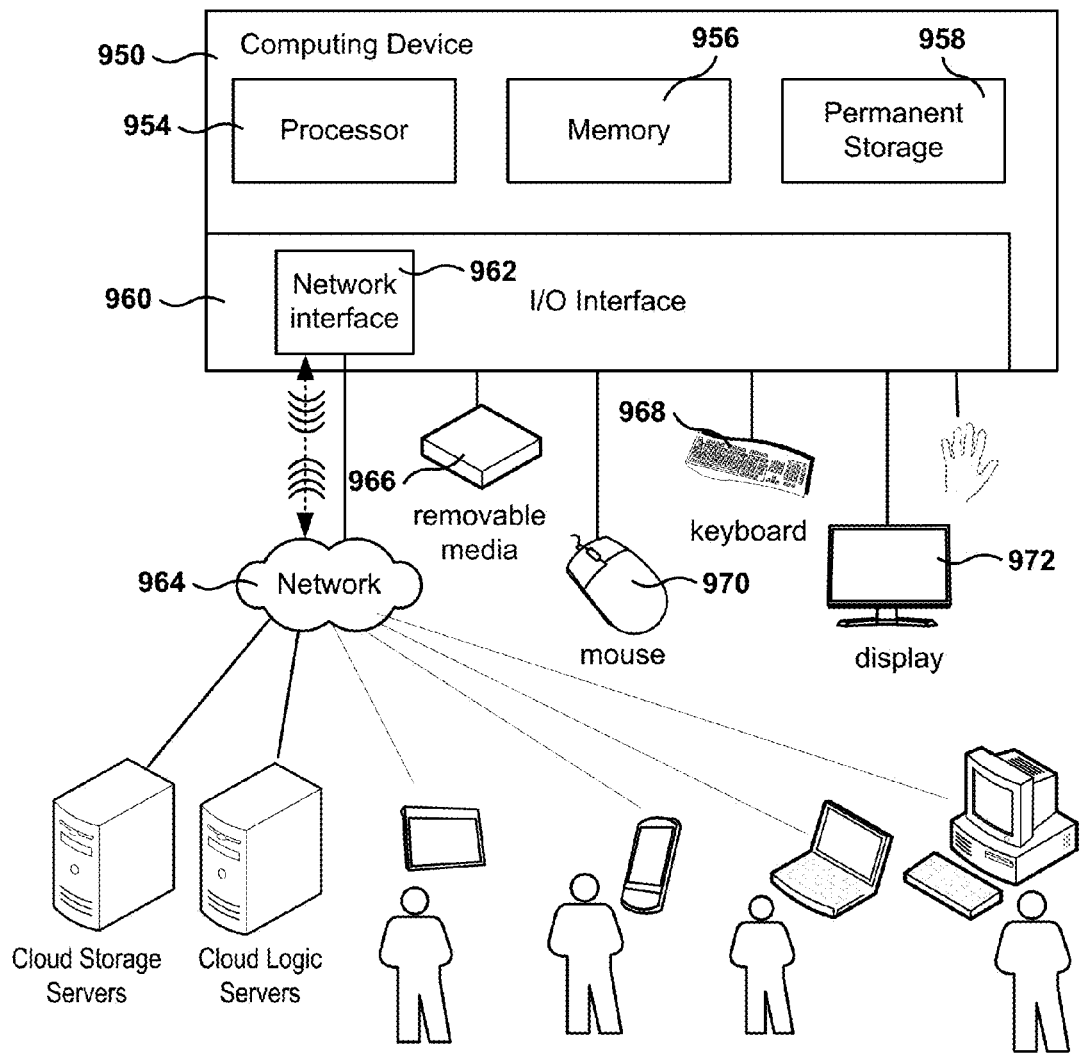
FIG. 22 is a simplified schematic diagram of a computer system for implementing implementations of the present disclosure.

FIG. 19 illustrates the operation of a batch process, following from the scenario described at FIG. 16 or 22. A batch process detects additions to anti-membership fields that are older than a specified time period. The batch process can be configured to read these anti-membership fields and detect whether a user is designated in a given anti-membership field. If so, then the designation is deleted, and any corresponding designation in an edge data field is also deleted. The designation of a user in an anti-membership field functions like a soft delete of a corresponding designation in a corresponding edge data field, as a later removal of the anti-membership designation may restore the membership defined by the corresponding edge data field. However, the operation of the batch process at a later time (e.g. additions to anti-membership fields that are older than about one to five days) acts as a hard delete, deleting both the designation in the anti-membership field and a corresponding designation in the corresponding edge data field.

With continued reference to FIG. 19, the batch process has detected that the additions to user A's anti-incoming edge data 826 and entity user +E's anti-outgoing edge data 832 were made at a time older than a specified time period. Entity user +E's anti-outgoing edge data 832 is read to determine if a designation is present. As user A is included in entity user +E's anti-outgoing edge data 832, then this designation is deleted, and a corresponding designation of user A in entity user +E's outgoing edge data is also deleted. These actions finalize removal of user A from entity user +E's circles. User A's anti-incoming edge data 826 is also read to determine if a designation is present. As entity user +E is included in user A's anti-incoming edge data 826, this designation is deleted and a corresponding designation of entity user +E in user A's incoming edge data 822 is also deleted. These action finalize removal of entity user +E as a follower of user A.

Figure 20:
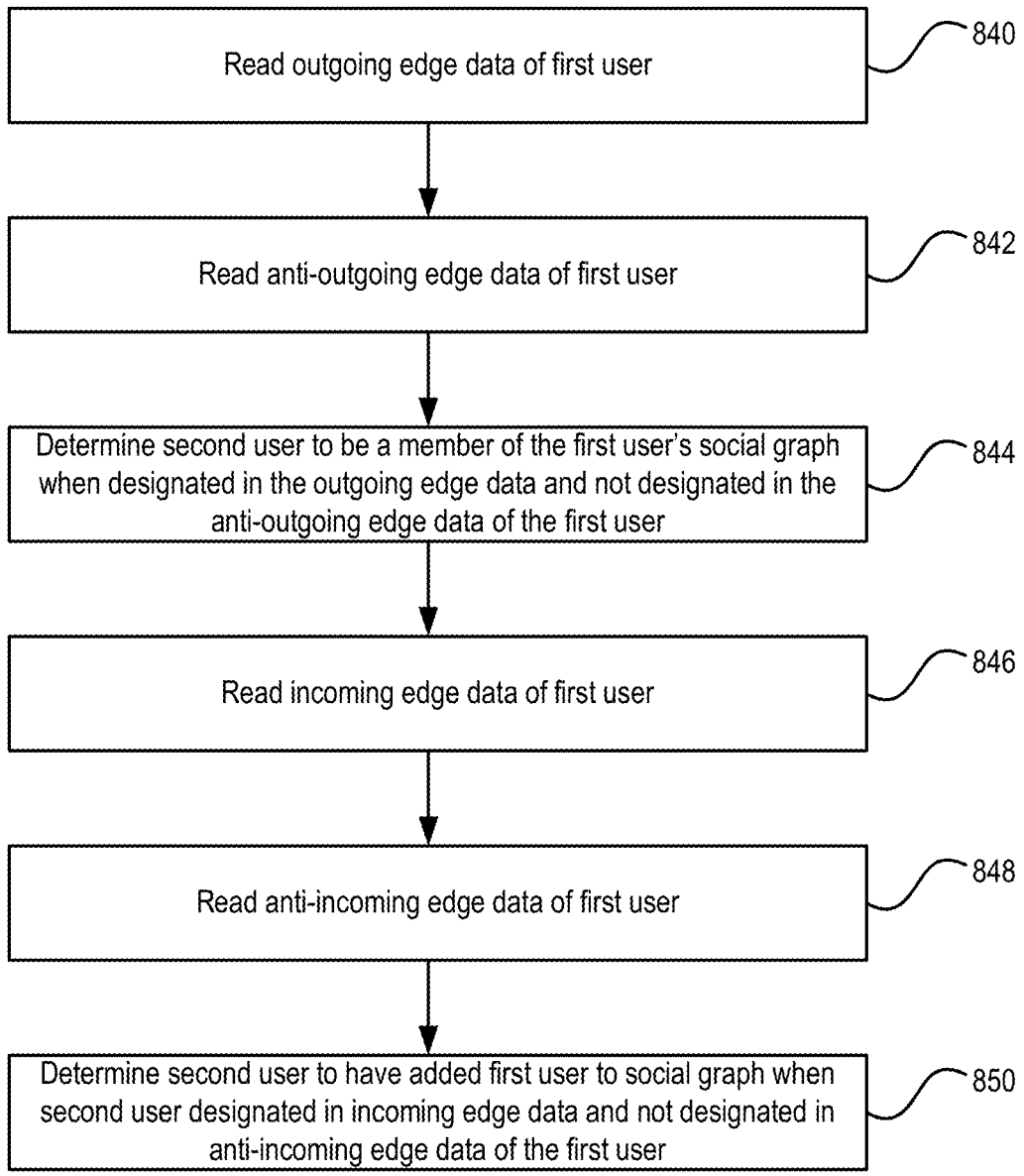
FIG. 20 illustrates a method for determining membership/follower status in a social network.

FIG. 20 illustrates a method for determining membership/follower status in a social network. At method operation 840 outgoing edge data of a first user is read. At method operation 842 anti-outgoing edge data of the first user is read. At method operation 844, a second user is determined to be a member of the first user's social graph when the second user is designated in the outgoing edge data and the second user is not designated in the anti-outgoing edge data of the first user. At method operation 846, incoming edge data of the first user is read. At method operation 848, anti-incoming edge data of the first user is read. At method operation 850, the second user is determined to have added the first user to the second user's social graph when the second user is designated in the incoming edge data of the first user and when the second user is not designated in the anti-incoming edge data of the first user.

Figure 21:
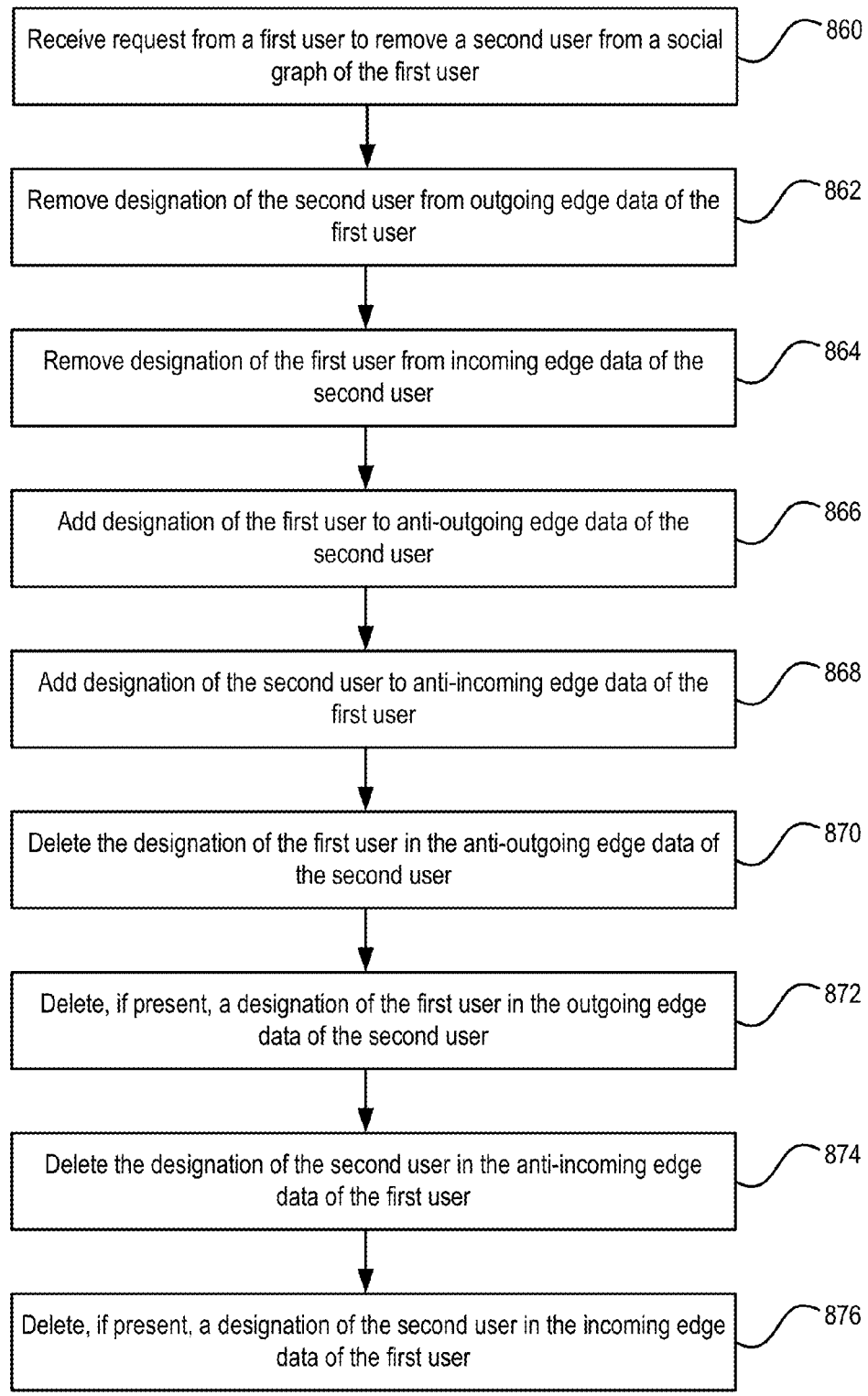
FIG. 21 illustrates a method for removing a second user from a social graph of a first user.

FIG. 21 illustrates a method for removing a second user from a social graph of a first user. At method operation 860, a request is received from a first user to remove a second user from a social graph of the first user. At method operation 862, a designation of the second user is removed from outgoing edge data of the first user, the outgoing edge data of the first user indicating one or more users as members of the first user's social graph when the one or more users are not also designated in anti-outgoing edge data of the first user. At method operation 864, a designation of the first user is removed from incoming edge data of the second user, the incoming edge data of the second user indicating one or more users as having added the second user to their social graphs, when the one or more users are not also designated in anti-incoming edge data of the second user. At method operation 866, a designation of the first user is added to anti-outgoing edge data of the second user, the designation of the first user in the anti-outgoing edge data of the second user preventing the first user from being determined as a member of the second user's social graph. At method operation 868, a designation of the second user is added to anti-incoming edge data of the first user, the designation of the second user in the anti-incoming edge data of the first user preventing the second user from being determined as having added the first user to the second user's social graph. At method operation 870, the designation of the first user in the anti-outgoing edge data of the second user is deleted. At method operation 872, if present, a designation of the first user in the outgoing edge data of the second user is deleted. At method operation 874, the designation of the second user in the anti-incoming edge data of the first user is deleted. At method operation 876, if present, a designation of the second user in the incoming edge data of the first user is deleted.

FIG. 22 is a simplified schematic diagram of a computer system for implementing implementations of the present disclosure. It should be appreciated that the methods described herein may be performed with a digital processing system, such as a conventional, general-purpose computer system. Special purpose computers, which are designed or programmed to perform only one function, may be used in the alternative. The computing device 950 includes a processor 954, which is coupled through a bus to memory 956, permanent storage 958, and Input/Output (I/O) interface 960.

Permanent storage 958 represents a persistent data storage device such as a hard drive or a USB drive, which may be local or remote. Network interface 962 provides connections via network 964, allowing communications (wired or wireless) with other devices. It should be appreciated that processor 954 may be embodied in a general-purpose processor, a special purpose processor, or a specially programmed logic device. Input/Output (I/O) interface 960 provides communication with different peripherals and is connected with processor 954, memory 956, and permanent storage 958, through the bus. Sample peripherals include display 972, keyboard 968, mouse 970, removable media device 966, etc.

Display 972 is configured to display the user interfaces described herein. Keyboard 968, mouse 970, removable media device 966, and other peripherals are coupled to I/O interface 960 in order to exchange information with processor 954. It should be appreciated that data to and from external devices may be communicated through I/O interface 960. Implementations of the disclosure can also be practiced in distributed computing environments where tasks are performed by remote processing devices that are linked through a wired or a wireless network.

Implementations of the present disclosure can be fabricated as computer readable code on a non-transitory computer readable storage medium. The non-transitory computer readable storage medium holds data which can be read by a computer system. Examples of the non-transitory computer readable storage medium include permanent storage 958, network attached storage (NAS), read-only memory or random-access memory in memory module 956, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor, such as processor 954 of FIG. 20. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Implementations presented herein recite a device or apparatus. The apparatus may be specially constructed for the required purpose or may be a general purpose computer. The apparatus includes a processor capable of executing the program instructions of the computer programs presented herein.

Further shown are a plurality of other devices, storage, and services that may be connected to network 964. Network 964 can be, for example the Internet. The Internet is interconnected with a plurality of devices, such as cloud storage servers, cloud logic servers, user interface devices, etc. Some devices that can communicate with the Internet access services on various cloud logic servers and cloud storage can include, for example tablet computers, smart phones, laptops, desktop computers, television systems, and the like. The devices that can communicate with each other require at least a processor, and a display for presenting user interface views from selected programs and code that render the user interfaces. The user interface can be provided through keyboard entry, text entry, voice entry, gesture entry, and combinations thereof.

The user interfaces can be presented in browsers of the various devices, can interpret HTML code, can render video, can communicate over the Internet by way of wireless communication, can render Flash video data, and the like. All of these devices, hardware implementations, and code are configured for enabling the interfacing and interaction with the social network, and the users of the social network, and users on various websites connected to the Internet. The interaction, through social networks will enable communication regarding current information, shared interests, chat communication, video communication, and general posting, interests, and relationship management. Broadly speaking, a social network is a site that allows at least two people or entities to communicate with one another and share at least one piece of data.

Although the foregoing implementations have been described with a certain level of detail for purposes of clarity, it is noted that certain changes and modifications can be practiced within the scope of the appended claims. Accordingly, the provided implementations are to be considered illustrative and not restrictive, not limited by the details presented herein, and may be modified within the scope and equivalents of the appended claims.

What is claimed is:

1. A method, comprising:
   receiving a request from a first user to remove a second user from a first social graph of the first user on a social network, the second user being different from the first user;
   receiving, by a processing device, first social graph data associated with the first social graph of a first user account of the first user and second social graph data associated with a second social graph of a second user account of the second user;
   in response to the request from the first user, updating, by the processing device, the first social graph and the second social graph data to remove a connection between the first user and the second user on the social network, wherein the updating comprises:
   removing, by the processing device, a designation of the second user from outgoing edge data of the first user in the first social graph data, wherein the outgoing edge data of the first user indicates that the second user is a member of the first user's social graph provided that the second user is not also designated in anti-outgoing edge data of the first user in the first social graph data, wherein the anti-outgoing edge data is associated with the outgoing edge data, and wherein the outgoing edge data and the anti-outgoing edge data are different sets of data; and
   removing, by the processing device, a designation of the first user from incoming edge data of the second user in the second social graph data, wherein the incoming edge data of the second user indicates that the first user has added the second user to the first user's social graph provided that the first user is not also designated in anti-incoming edge data of the second user in the second social graph data, wherein the anti-incoming edge data is associated with the incoming edge data, and wherein the incoming edge data and the anti-incoming edge data are different sets of data; and preventing, based on the outgoing edge data, anti-outgoing edge data, incoming edge data, and anti-incoming edge data, an addition of the first user to the social graph of the second user.

2. The method of claim 1, wherein the updating further comprises:
adding a designation of the first user to anti-outgoing edge data of the second user in the second social graph data, the designation of the first user in the anti-outgoing edge data of the second user preventing the first user from being determined as a member of the second user's social graph; and
adding a designation of the second user to anti-incoming edge data of the first user in the first social graph data, the designation of the second user in the anti-incoming edge data of the first user preventing the second user from being determined as having added the first user to the second user's social graph.

3. The method of claim 2,
wherein the outgoing edge data and anti-outgoing edge data of the first user together define membership in the first user's social graph;
wherein the incoming edge data and the anti-incoming edge data of the first user together define one or more users that have added the first user to their social graphs;
wherein the outgoing edge data and the anti-outgoing edge data of the second user together define membership in the second user's social graph; and
wherein the incoming edge data and the anti-incoming edge data of the second user together define one or more users that have added the second user to their social graphs.

4. The method of claim 2, further comprising,
deleting the designation of the first user in the anti-outgoing edge data of the second user;
deleting, if present, a designation of the first user in the outgoing edge data of the second user;
deleting the designation of the second user in the anti-incoming edge data of the first user; and
deleting, if present, a designation of the second user in the incoming edge data of the first user.

5. The method of claim 4, wherein each of the deletion operations is performed at a substantially later time than each of the adding operations.

6. The method of claim 1,
wherein the first user is a person user; and
wherein the second user is an entity user.

7. A non-transitory computer readable medium, which when executed by one or more processors, cause the one or more processors to:
receive a request from a first user to remove a second user from a social graph of the first user on a social network, the second user being different from the first user;
receive first social graph data associated with the first social graph of a first user account of the first user and second social graph data associated with a second social graph of a second user account of the second user; and
in response to the request from the first user, update the first social graph data and the second social graph data to remove a connection between the first user and the second user on the social network, wherein to update the processor is further to:
remove a designation of the second user from outgoing edge data of the first user in the first social graph data, wherein the outgoing edge data of the first user indicates that the second user is a member of the first user's social graph provided that the second user is not also designated in anti-outgoing edge data of the first user in the first social graph data, wherein the anti-outgoing edge data is associated with the outgoing edge data, and wherein the outgoing edge data and the anti-outgoing edge data are different sets of data; and
remove a designation of the first user from incoming edge data of the second user in the second social graph data, wherein the incoming edge data of the second user indicates that the first user has added the second user to the first user's social graph provided that the first user is not also designated in anti-incoming edge data of the second user in the second social graph data, wherein the anti-incoming edge data is associated with the incoming edge data, and wherein the incoming edge data and the anti-incoming edge data are different sets of data; and
prevent, based on the outgoing edge data, anti-outgoing edge data, incoming edge data, and anti-incoming edge data, an addition of the first user to a social graph of the second user.

8. The computer readable medium of claim 7, wherein to update the first social graph data the processor is further to:
add a designation of the first user to anti-outgoing edge data of the second user in the second social graph data, the designation of the first user in the anti-outgoing edge data of the second user preventing the first user from being determined as a member of the second user's social graph; and
add a designation of the second user to anti-incoming edge data of the first user in the first social graph data, the designation of the second user in the anti-incoming edge data of the first user preventing the second user from being determined as having added the first user to the second user's social graph.

9. The computer readable medium of claim 8,
wherein the outgoing edge data and anti-outgoing edge data of the first user together define membership in the first user's social graph;
wherein the incoming edge data and the anti-incoming edge data of the first user together define one or more users that have added the first user to their social graphs;
wherein the outgoing edge data and the anti-outgoing edge data of the second user together define membership in the second user's social graph; and
wherein the incoming edge data and the anti-incoming edge data of the second user together define one or more users that have added the second user to their social graphs.

10. The computer readable medium of claim 8, wherein the processor is further to:
delete the designation of the first user in the anti-outgoing edge data of the second user;
delete, if present, a designation of the first user in the outgoing edge data of the second user;
delete the designation of the second user in the anti-incoming edge data of the first user; and
delete, if present, a designation of the second user in the incoming edge data of the first user.

11. The computer readable medium of claim 10, wherein each of the deletion operations is performed at a substantially later time than each of the adding operations.

12. The computer readable medium of claim 7,
wherein the first user is a person user; and
wherein the second user is an entity user.

13. A system comprising:
a memory to store first social graph data and second social graph data;
a processor coupled to the memory, the processor to:

receive a request from a first user to remove a second user from a social graph of the first user on a social network, the second user being different from the first user;

receive the first social graph data associated with the first social graph of a first user account of the first user and the second social graph data associated with a second social graph of a second user account of the second user; and in response to the request from the first user, update the first social graph data and the second social graph data to remove a connection between the first user and the second user on the social network, wherein to update the processor is further to:

remove a designation of the second user from outgoing edge data of the first user in the first social graph data, wherein the outgoing edge data of the first user indicates that the second user is a member of the first user's social graph provided that the second user is not also designated in anti-outgoing edge data of the first user in the first social graph data, wherein the anti-outgoing edge data is associated with the outgoing edge data, and wherein the outgoing edge data and the anti-outgoing edge data are different sets of data; and remove a designation of the first user from incoming edge data of the second user in the second social graph data, wherein the incoming edge data of the second user indicates that the first user has added the second user to the first user's social graph provided that the first user is not also designated in anti-incoming edge data of the second user in the second social graph data, wherein the anti-incoming edge data is associated with the incoming edge data, and wherein the incoming edge data and the anti-incoming edge data are different sets of data; and prevent, based on the outgoing edge data, anti-outgoing edge data, incoming edge data, and anti-incoming edge data, an addition of the first user to a social graph of the second user.

14. The system of claim 13, wherein to update the first social graph data the processor is further to:

add a designation of the first user to anti-outgoing edge data of the second user in the second social graph data, the designation of the first user in the anti-outgoing edge data of the second user preventing the first user from being determined as a member of the second user's social graph; and add a designation of the second user to anti-incoming edge data of the first user in the first social graph data, the designation of the second user in the anti-incoming edge data of the first user preventing the second user from being determined as having added the first user to the second user's social graph.

15. The system of claim 14, wherein the outgoing edge data and anti-outgoing edge data of the first user together define membership in the first user's social graph;

wherein the incoming edge data and the anti-incoming edge data of the first user together define one or more users that have added the first user to their social graphs;

wherein the outgoing edge data and the anti-outgoing edge data of the second user together define membership in the second user's social graph; and wherein the incoming edge data and the anti-incoming edge data of the second user together define one or more users that have added the second user to their social graphs.

16. The system of claim 14, wherein the processor is further to:

delete the designation of the first user in the anti-outgoing edge data of the second user;

delete, if present, a designation of the first user in the outgoing edge data of the second user;

delete the designation of the second user in the anti-incoming edge data of the first user; and delete, if present, a designation of the second user in the incoming edge data of the first user.

17. The system of claim 16, wherein each of the deletion operations is performed at a substantially later time than each of the adding operations.

18. The system of claim 13, wherein the first user is a person user; and wherein the second user is an entity user.

* * * * *